(12) United States Patent
Dowling et al.

(10) Patent No.: US 7,646,387 B2
(45) Date of Patent: *Jan. 12, 2010

(54) DEVICE DEPENDENT RENDERING

(75) Inventors: Terence S. Dowling, San Jose, CA (US); Jeremy A. Hall, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 240 days.

This patent is subject to a terminal disclaimer.

(21) Appl. No.: 11/403,049

(22) Filed: Apr. 11, 2006

(65) Prior Publication Data
US 2006/0181533 A1      Aug. 17, 2006

Related U.S. Application Data

(63) Continuation of application No. 10/388,828, filed on Mar. 14, 2003, which is a continuation of application No. 09/378,237, filed on Aug. 19, 1999, now Pat. No. 6,563,502.

(51) Int. Cl.
*G06T 11/00* (2006.01)
*G09G 5/00* (2006.01)
(52) U.S. Cl. ..................... 345/469; 345/613
(58) Field of Classification Search .... 345/467–472.32, 345/469, 613
See application file for complete search history.

(56) References Cited

U.S. PATENT DOCUMENTS

| | | | |
|---|---|---|---|
| 4,200,861 A | 4/1980 | Hubach et al. |
| 4,331,955 A | 5/1982 | Hansen |
| 4,486,785 A | 12/1984 | Lasher et al. |
| 4,580,231 A | 4/1986 | Tidd et al. |
| 4,591,844 A | 5/1986 | Hickin et al. |
| 4,667,247 A | 5/1987 | Karow |
| 4,672,369 A | 6/1987 | Preiss et al. |
| 4,675,830 A | 6/1987 | Hawkins |
| 4,720,705 A | 1/1988 | Gupta et al. |
| 4,780,711 A | 10/1988 | Doumas |
| 4,783,652 A | 11/1988 | Lumelsky |
| 4,827,255 A | 5/1989 | Ishii |
| 4,851,825 A | 7/1989 | Naiman |

(Continued)

FOREIGN PATENT DOCUMENTS

DE      69622961      8/2002

(Continued)

OTHER PUBLICATIONS

Foley et al.; "Computer Graphics Principles and Practice —Second Edition"; Addison-Wesley Publishing Company; 1990; pp. 132-140, pp. 617-646, and 965-979.

(Continued)

*Primary Examiner*—Ulka Chauhan
*Assistant Examiner*—Jeffrey J Chow
(74) *Attorney, Agent, or Firm*—Fish & Richardson P.C.

(57) ABSTRACT

Method and apparatus implementing and using techniques for processing a character for display on a raster output device having a resolution defined by a set of output pixel positions. A stem of the character is aligned to a best sub-pixel boundary. The character is rendered at a resolution higher than the resolution of the raster output device. The aligned character is downsampled to the raster output device resolution.

45 Claims, 14 Drawing Sheets

U.S. PATENT DOCUMENTS

| | | | |
|---|---|---|---|
| 4,907,282 A | 3/1990 | Daly et al. |
| 4,908,780 A | 3/1990 | Priem et al. |
| 4,928,252 A | 5/1990 | Gabbe et al. |
| 4,945,351 A | 7/1990 | Naiman |
| 5,099,435 A | 3/1992 | Collins et al. |
| 5,132,674 A | 7/1992 | Bottorf |
| 5,241,653 A | 8/1993 | Collins et al. |
| 5,278,678 A | 1/1994 | Harrington |
| 5,280,577 A | 1/1994 | Trevett et al. |
| 5,299,308 A | 3/1994 | Suzuki et al. |
| 5,301,267 A | 4/1994 | Hassett et al. |
| 5,304,989 A | 4/1994 | Martinez et al. |
| 5,325,479 A | 6/1994 | Kaasila |
| 5,386,509 A | 1/1995 | Suzuki et al. |
| 5,398,306 A | 3/1995 | Karow |
| 5,416,898 A | 5/1995 | Opstad |
| 5,459,828 A | 10/1995 | Zack et al. |
| 5,517,601 A | 5/1996 | Rust et al. |
| 5,519,824 A | 5/1996 | Lizzi |
| 5,544,294 A | 8/1996 | Cho et al. |
| 5,568,597 A | 10/1996 | Nakayama et al. |
| 5,633,991 A | 5/1997 | Hakaridani et al. |
| 5,664,086 A | 9/1997 | Brock et al. |
| 5,673,371 A | 9/1997 | Koopman et al. |
| 5,684,510 A | 11/1997 | Brassell et al. |
| 5,734,388 A | 3/1998 | Ristow et al. |
| 5,754,187 A | 5/1998 | Ristow et al. |
| 5,771,048 A | 6/1998 | Nankou et al. |
| 5,808,600 A | 9/1998 | Mochizuki |
| 5,825,370 A | 10/1998 | Yoshida et al. |
| 5,852,448 A | 12/1998 | Cheng |
| 5,857,067 A | 1/1999 | Hassett et al. |
| 5,909,221 A | 6/1999 | Nakai et al. |
| 5,910,805 A | 6/1999 | Hickey et al. |
| 5,929,866 A | 7/1999 | Arnold |
| 5,940,080 A | 8/1999 | Ruehle et al. |
| 5,943,063 A | 8/1999 | Dowling |
| 5,959,634 A | 9/1999 | Yoshida |
| 5,995,086 A | 11/1999 | Dowling et al. |
| 6,005,588 A | 12/1999 | Guha |
| 6,104,833 A | 8/2000 | Naoi et al. |
| 6,128,415 A | 10/2000 | Hultgren et al. |
| 6,141,441 A | 10/2000 | Cass et al. |
| 6,229,521 B1 | 5/2001 | Yip |
| 6,236,390 B1 | 5/2001 | Hitchcock |
| 6,266,444 B1 | 7/2001 | Yoshida |
| 6,282,327 B1 | 8/2001 | Betrisey et al. |
| 6,288,725 B1 | 9/2001 | Fu |
| 6,288,726 B1 | 9/2001 | Ballard |
| 6,323,879 B1 | 11/2001 | Sauerbrei |
| 6,330,003 B1 | 12/2001 | Curtis et al. |
| 6,342,890 B1 | 1/2002 | Shetter |
| 6,356,278 B1 | 3/2002 | Stamm et al. |
| 6,369,902 B1 | 4/2002 | Beaman et al. |
| 6,377,262 B1 | 4/2002 | Hitchcock et al. |
| 6,384,839 B1 | 5/2002 | Paul |
| 6,408,109 B1 | 6/2002 | Silver et al. |
| 6,438,576 B1 | 8/2002 | Huang et al. |
| 6,459,431 B1 | 10/2002 | Browne et al. |
| 6,563,502 B1 | 5/2003 | Dowling et al. |
| 6,614,432 B1 | 9/2003 | Merrill |
| 6,897,879 B2 | 5/2005 | Lyapunov et al. |
| 6,950,986 B1 | 9/2005 | Jacobi et al. |
| 7,064,758 B2 | 6/2006 | Chik et al. |
| 7,190,367 B2 | 3/2007 | Perry et al. |
| 7,408,555 B2 | 8/2008 | Arnold et al. |
| 7,408,556 B2 | 8/2008 | Brown |
| 2001/0023896 A1 | 9/2001 | He et al. |
| 2001/0048764 A1 | 12/2001 | Betrisey et al. |
| 2002/0093476 A1* | 7/2002 | Hill et al. ............... 345/89 |
| 2002/0093502 A1 | 7/2002 | Koyama |
| 2002/0105515 A1 | 8/2002 | Mochizuki |
| 2002/0108521 A1 | 8/2002 | Velde et al. |
| 2002/0173947 A1 | 11/2002 | Soskov et al. |
| 2003/0080969 A1 | 5/2003 | Barmettler |
| 2003/0214513 A1 | 11/2003 | Brown et al. |
| 2004/0001069 A1 | 1/2004 | Snyder et al. |
| 2004/0119724 A1 | 6/2004 | Hawksworth |
| 2004/0189666 A1 | 9/2004 | Frisken et al. |
| 2004/0212620 A1 | 10/2004 | Dowling et al. |
| 2004/0227770 A1 | 11/2004 | Dowling et al. |
| 2004/0227771 A1 | 11/2004 | Arnold et al. |
| 2005/0190183 A1 | 9/2005 | Barone et al. |
| 2005/0219247 A1 | 10/2005 | Arnold et al. |
| 2005/0219248 A1 | 10/2005 | Arnold et al. |
| 2006/0017733 A1 | 1/2006 | Matskewich et al. |
| 2007/0030272 A1 | 2/2007 | Dowling et al. |
| 2007/0188497 A1 | 8/2007 | Dowling et al. |
| 2008/0068383 A1 | 3/2008 | Dowling |

FOREIGN PATENT DOCUMENTS

| | | |
|---|---|---|
| EP | 0 214 547 | 3/1987 |
| EP | 0 397 299 | 11/1990 |
| EP | 0 428 356 | 5/1991 |
| EP | 0 435 391 | 7/1991 |
| EP | 0 468 652 | 1/1992 |
| EP | 0 506 381 A | 9/1992 |
| EP | 0 304 509 | 6/1993 |
| EP | 0 667 596 A1 | 2/1994 |
| EP | 0 590 923 | 4/1994 |
| EP | 0 654 778 | 5/1995 |
| EP | 0 667 596 | 8/1995 |
| EP | 0 693 740 | 1/1996 |
| EP | 0 772 144 | 5/1997 |
| EP | 1 077 445 | 2/2001 |
| GB | 2 236 463 | 4/1991 |
| JP | 2-275494 | 11/1990 |
| JP | 900039606 | 10/1991 |
| JP | 6-208370 | 7/1994 |
| WO | 86/04703 | 8/1986 |
| WO | 94/06094 | 3/1994 |
| WO | 94/29843 | 12/1994 |
| WO | 00/52673 | 9/2000 |
| WO | 2004/104933 | 12/2004 |
| WO | 2004/104937 | 12/2004 |
| WO | 2005/097490 | 10/2005 |
| WO | 2005/098757 | 10/2005 |

OTHER PUBLICATIONS

Foley et al.; "Computer Graphics Principles and Practice—Second Edition"; Addison-Wesley Publishing Company; 1990; pp. 584-586, 589-590, 599-600, 642-646 and 693-695.

"gasp —Grid-fitting And Scan-conversion Procedure", http://www.microsoft.com/typography/otspec/gast.htm, 1998, 2 pages.

"The TrueType instruction set", http://www.microsoft.com/typography/otspec/ttinst.htm, 1997, Cover sheet (1 page); pp. 181-261.

Platt, John C., Optimal Filtering for Patterned Displays, Microsoft Research, IEEE Signal Processing Letters, vol. 7, No. 7, pp. 179-80 (2000).

Betrisey, et al., 20.4: Displaced Filtering for Patterned Displays, SID 00 Digest, 4 pages.

Microsoft Corporation, What is ClearType? [online], page last updated Jan. 16, 2002, www.microsoftcom/typography/cleartype/what.htm?frame='%208fsize.

Microsoft Corporation, Microsoft ClearType FAQ [online], page last updated Sep. 26, 2002, http://www.microsoft.ocm/typography/faq/faq15.htm.

Microsoft Corporation, ClearType Antialiasing, 2003 [2003], http://msdn.microsoft.ocm/library/default.asp?url=/library/en-us/gdi/fonttext-osgn.asp.

SMPTE 170M-1999, SMPTE Standard for Television, "Composite Analog Video Signal—NTSC for Studio Applications," The Society of Motion Picture and Television Engineers.

Sub-Pixel Font Rendering Technology—Implementation Details, last edit on Dec. 8, 1999 [online] http://grc.com/cttech.htm.

Sub-Pixel Font Rendering Technology—Who Did It First? [online], last edit on Feb. 29, 2000, http://grc.com/ctwho.htm.

Sub-Pixel Font Rendering Technology—Visitor Dialog Q&A [online] last edit Oct. 4, 2003, http://grc.com/ctdialog.htm.

Sub-Pixel Font Rendering Technology—How It Works [online], last edit on Feb. 11, 2002, http://grc.com/ctwhat.htm.

Taligent Documentation, "Miter limit joint" [online],1995 [retrieved on Mar. 8, 2007]. Retrieved from the Internet: <URL: http://www.cubik.org/mirrors/taligent/Docs/books/GS/GS_134.html>.

Wikipedia, "Transformation matrix" [online], [retrieved on Mar. 8, 2007]. Retrieved from the Internet: <URL: http://en.wikipedia.org/wiki/Matrix_transformation> 5 pages.

Display Flicker Reduction by Use of Anisotropic Filtering. IBM Technical Disclosure Bulletin vol. 27, Issue 1, Jan. 1, 1985, see p. 4662.

International Search Report and Written Opinion of the International Searching Authority, PCT Application Serial No. PCT/US07/78943, Aug. 20, 2008, 12 pp.

Dowling et al., "Winding Order Test for Digital Fonts", Pending U.S. Appl. No. 11/464,743 filed Aug. 15, 2006.

Narrative Disclosure Statement.

Phinney, Thomas, W., "TrueType & Post Script Type 1: What's the Difference?", 10 pages [online], 1997. Retrieved from the Internet: <URL: http://www.truetype.demon.co.uk/articles/ttvst1.htm> on Jan. 12, 2006.

"True Type Typography: A History of True Type", 6 pgaes [online], 2005. Retrieved from the Internet: <URL: http://ww.truetype.demon.co.uk/tthist.htm> Jan. 12, 2006.

Microsoft Developer Network (MSDN), "Glyph and Fragment Caches" [online], retrieved from the Internet: http://msdn.microsoft.com/en-us/library/cc241670.aspx, Retrieved on Oct. 23, 2008, ©2008 Microsoft Corporation, 1 page.

International Search Report and Written Opinion of the International Searching Authority, PCT Application Serial No. PCT/US05/09933, Feb. 23, 2006, 10 pp.

International Search Report and Written Opinion of the International Searching Authority, PCT Application Serial No. PCT/US05/09934, Nov. 8, 2006, 9 pp.

Non-Final Office Action dated Jan. 4, 2006, from U.S. Appl. No. 10/816,587, 20 pages.

Non-Final Office Action Dated Apr. 30, 2009, from U.S. Appl. No. 11/464,716.

Snapshot from Feb. 3, 1999, How Sub-Pixel Font Rendering Works, "How It Works" [online], retrieved from the Internet: http://web.archive.org/web/19990508193320/www.spinrite.com/ctwhat.htm, Retrieved on Jun. 26, 2009, 10 pages.

Snapshot from Feb. 3, 1999, Sub-Pixel Rendering Implementation Details, "Sub-Pixel Font Rendering Technology" [online], retrieved from the Internet:http://web.archive.org/web/20040112153322/www.spinrite.com/cttech.htm, Retrieved on Jun. 26, 2009, 7 pages.

* cited by examiner

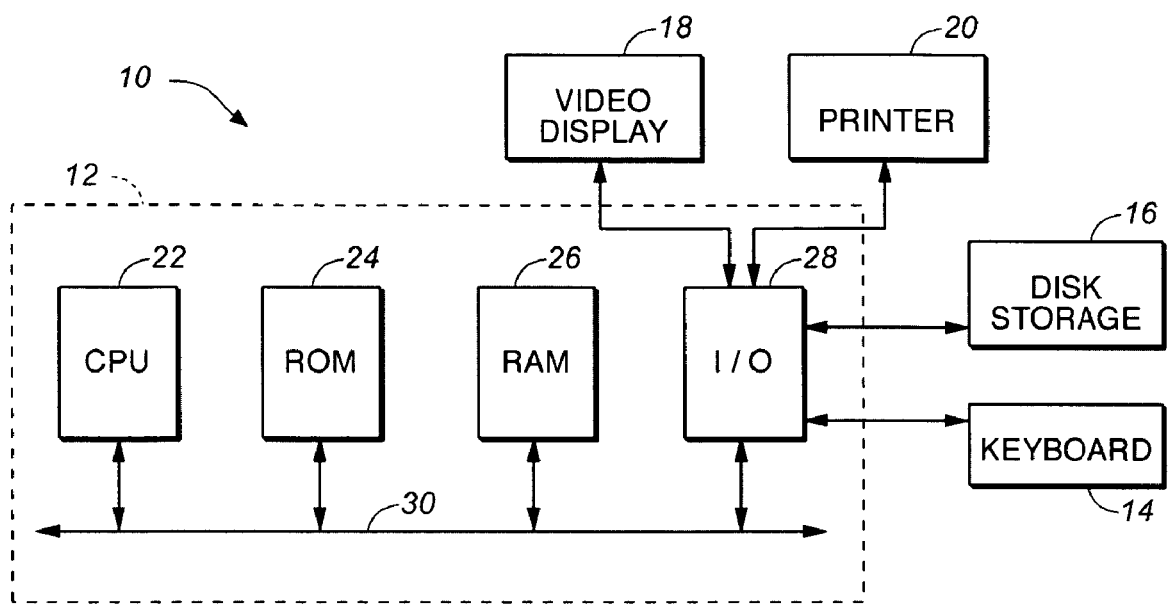
FIG._1
(PRIOR ART)

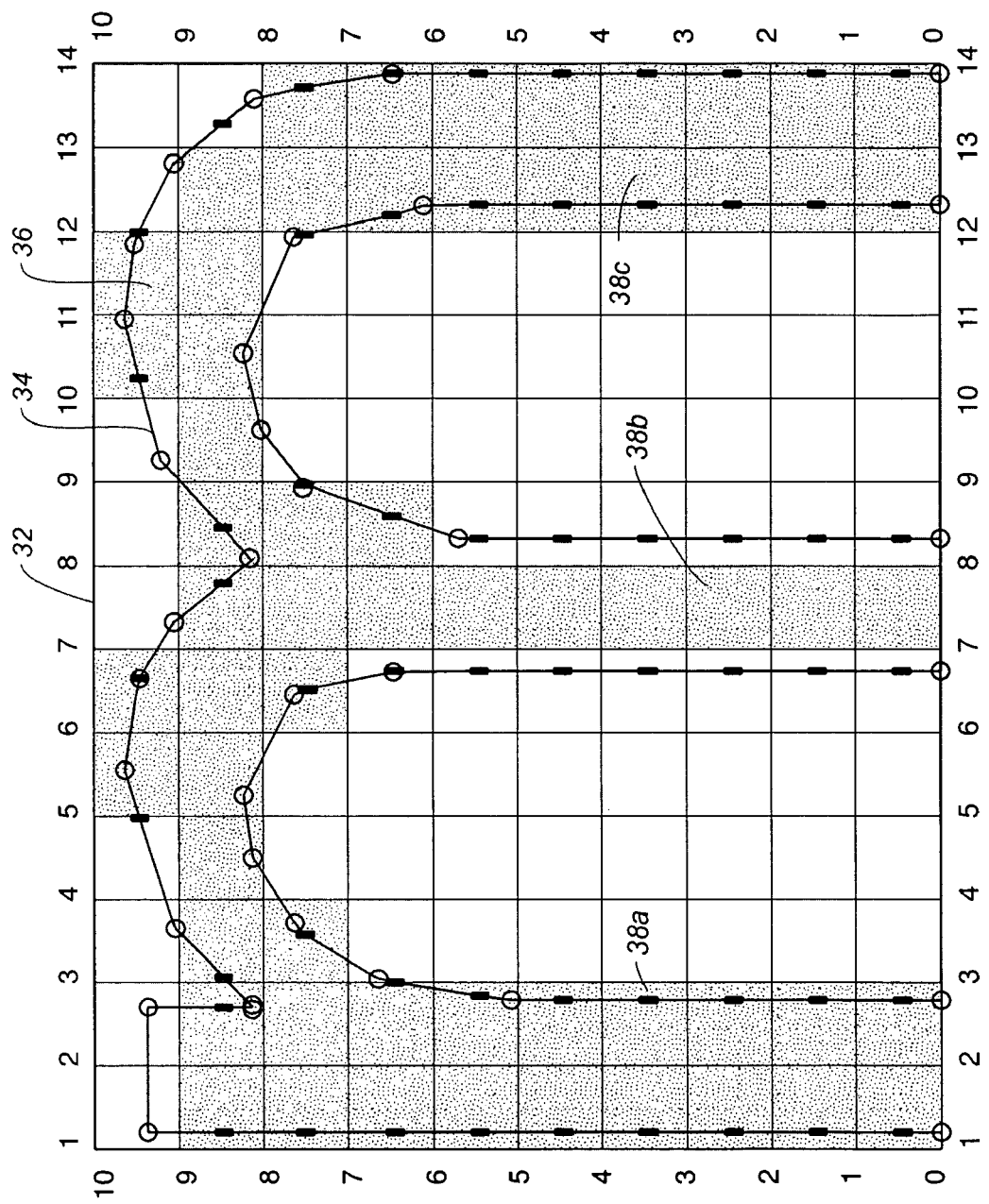
FIG._2A (PRIOR ART)

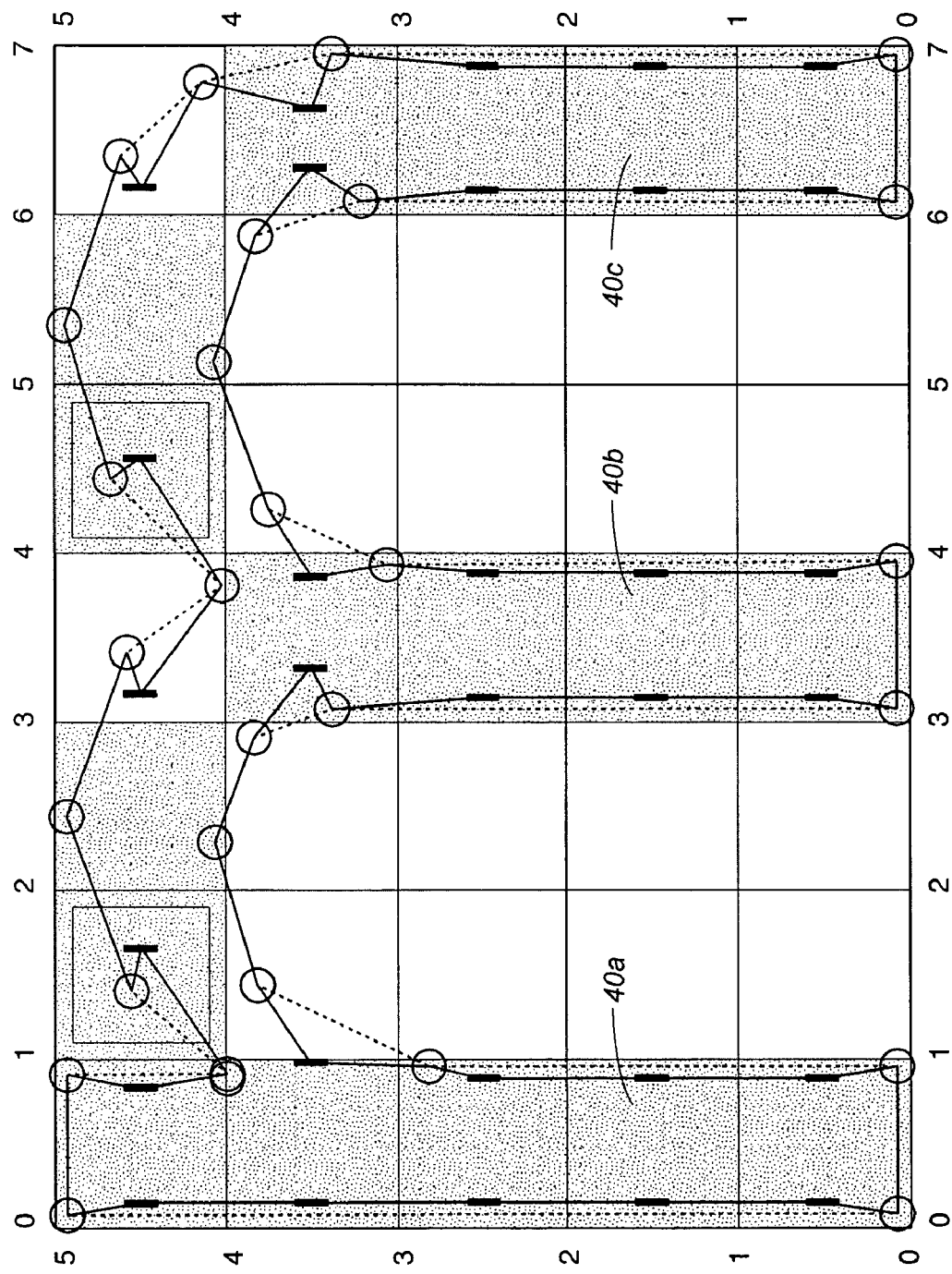
FIG._2B
(PRIOR ART)

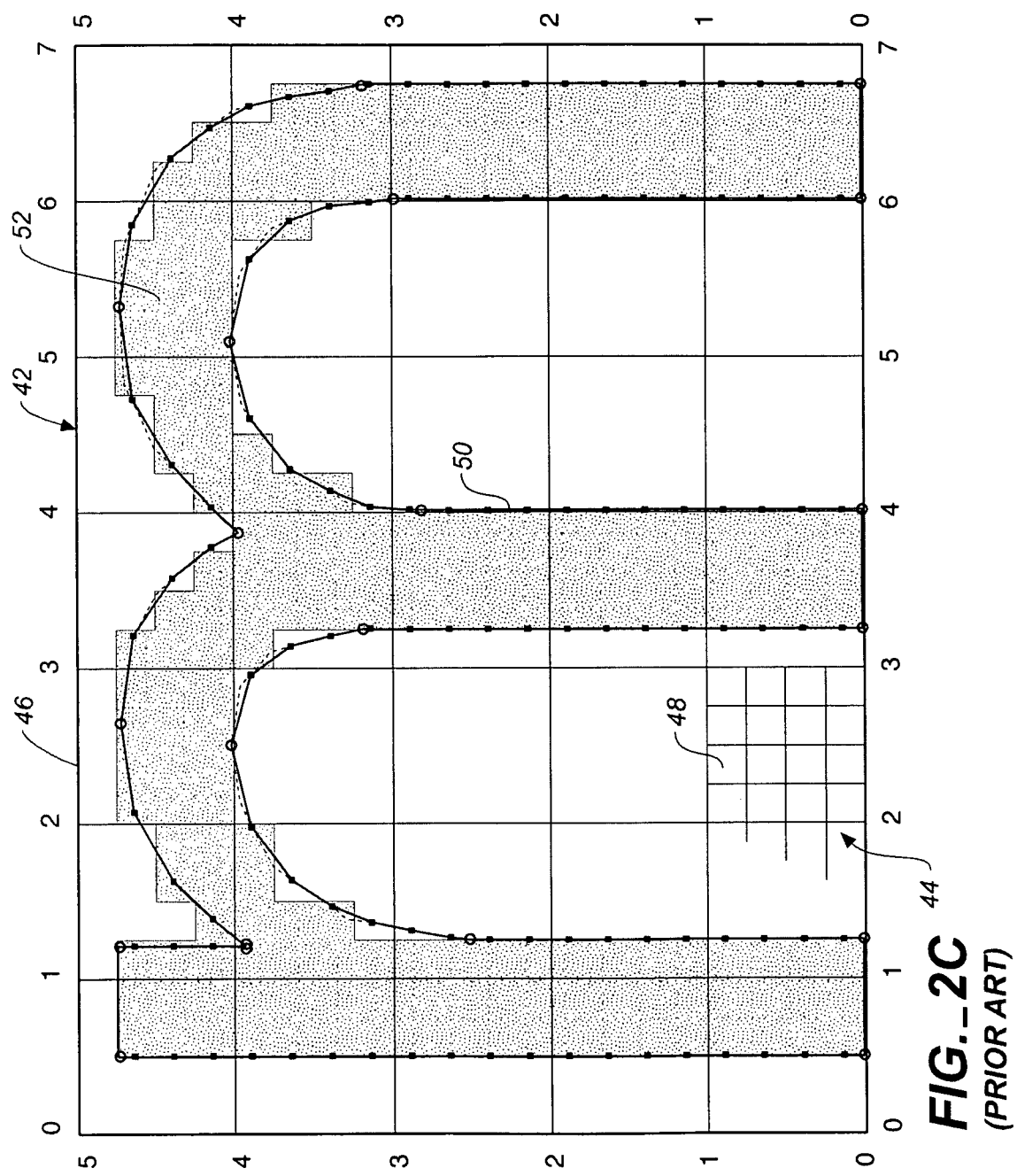
FIG._2C (PRIOR ART)

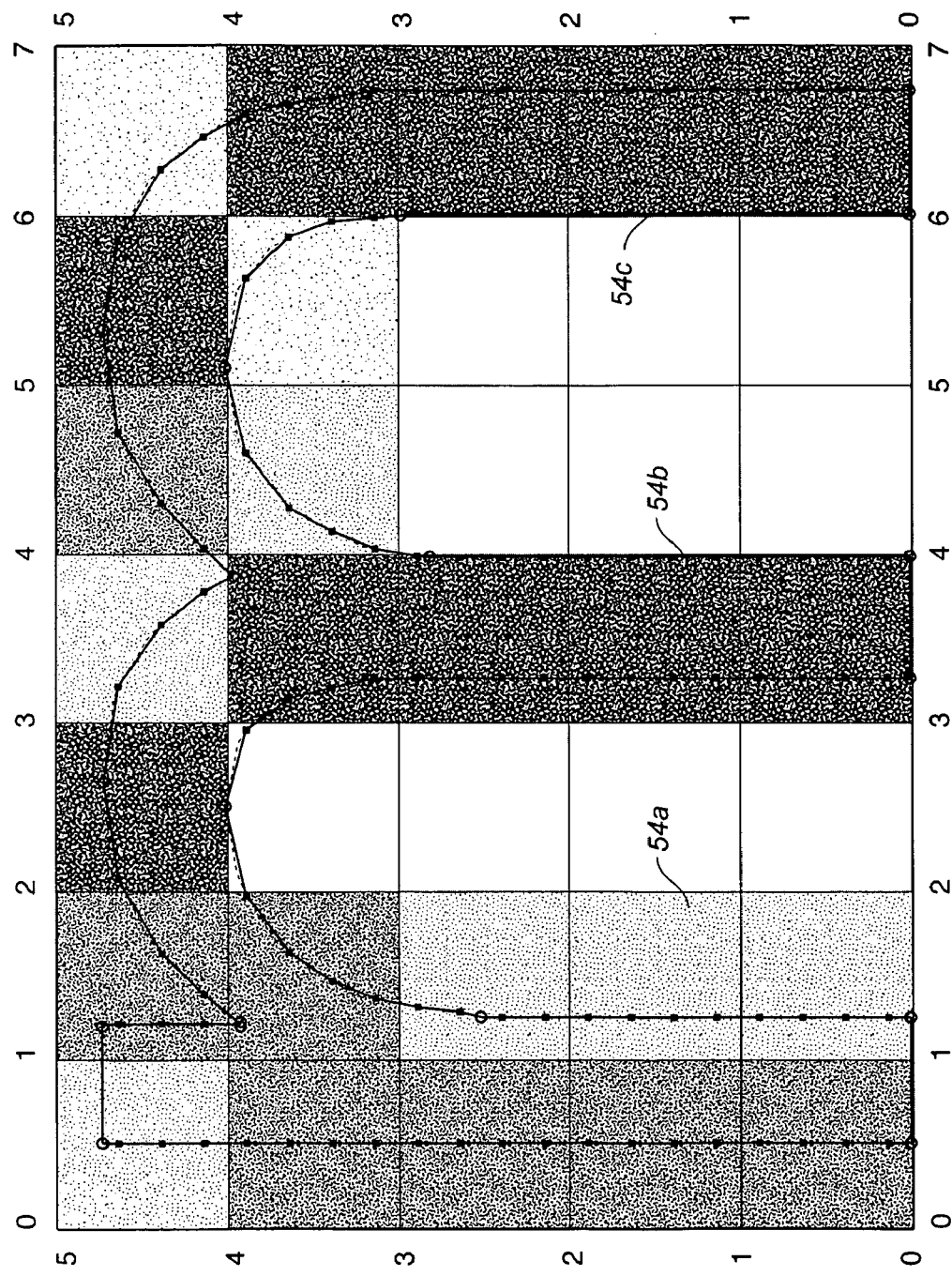
FIG._2D
(PRIOR ART)

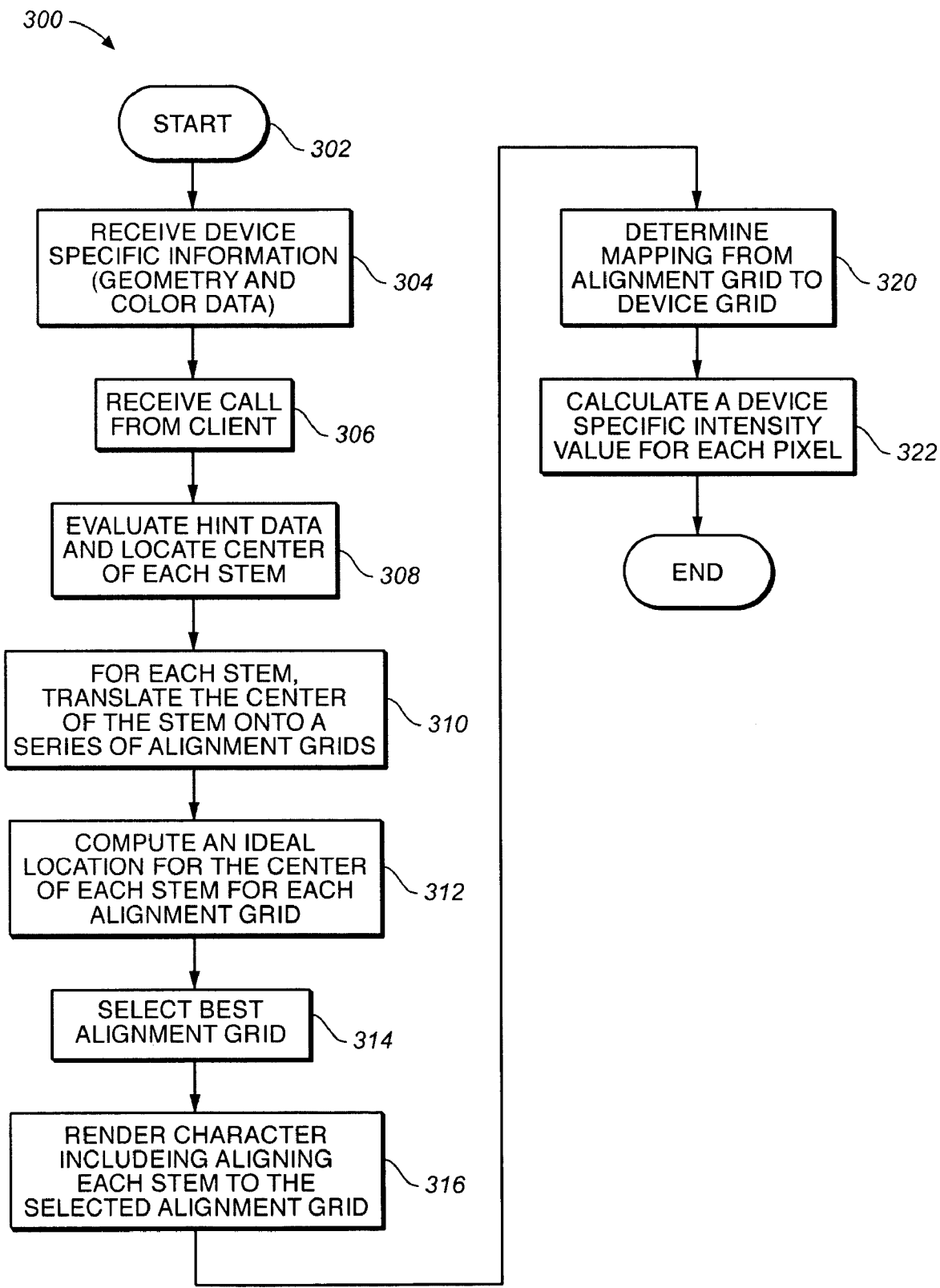
FIG._3A

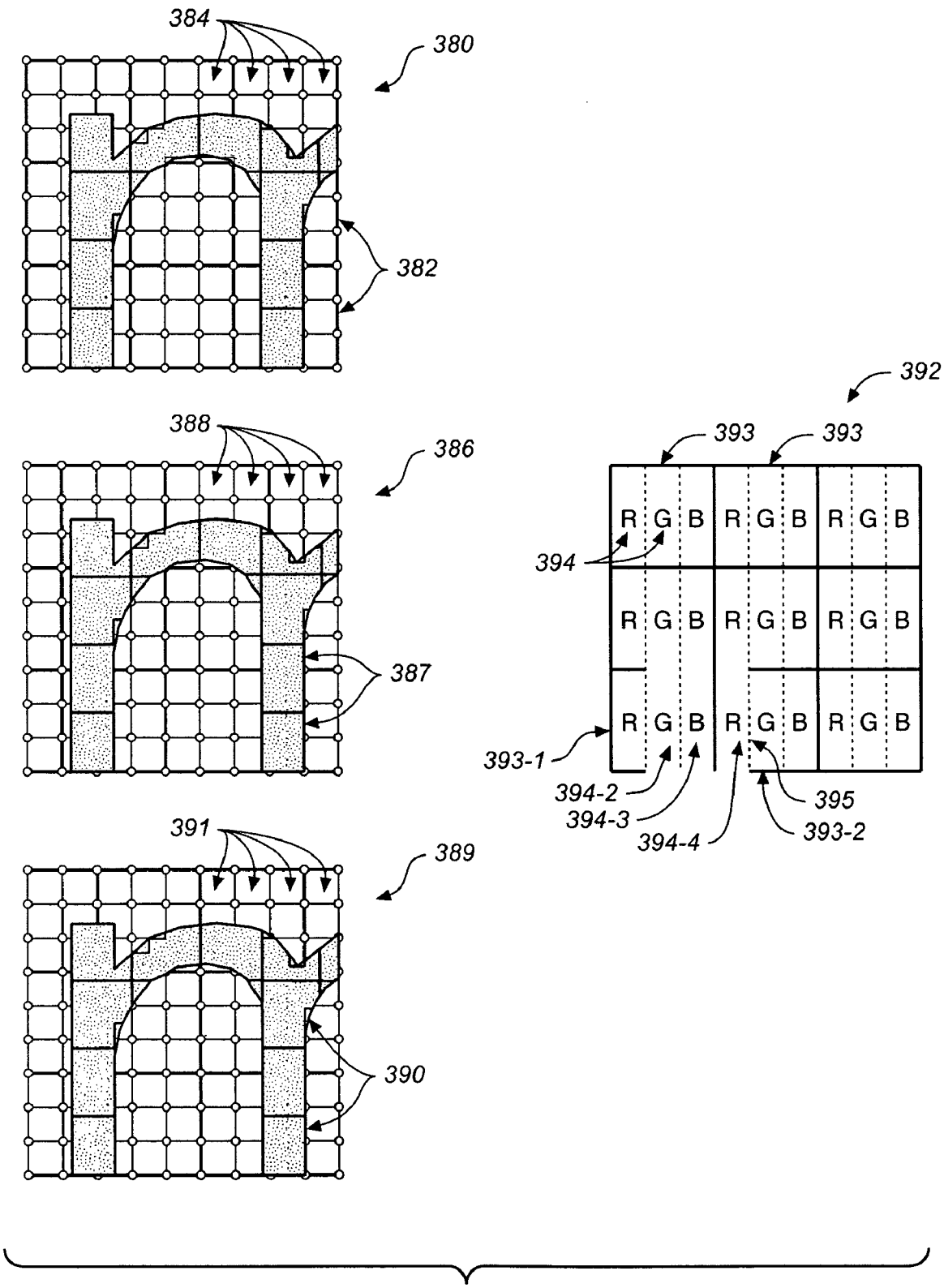
FIG._3B

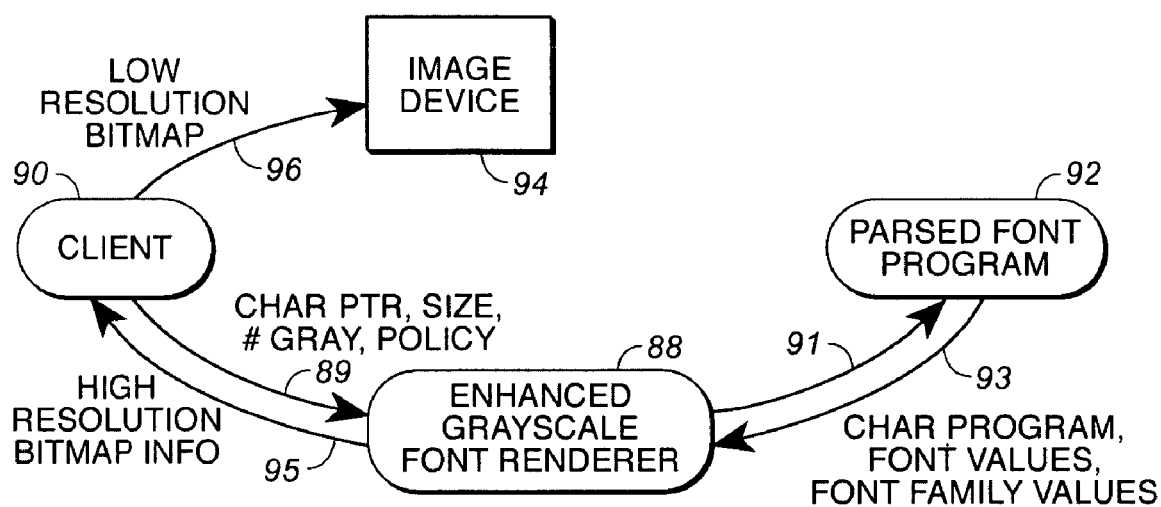
FIG._4

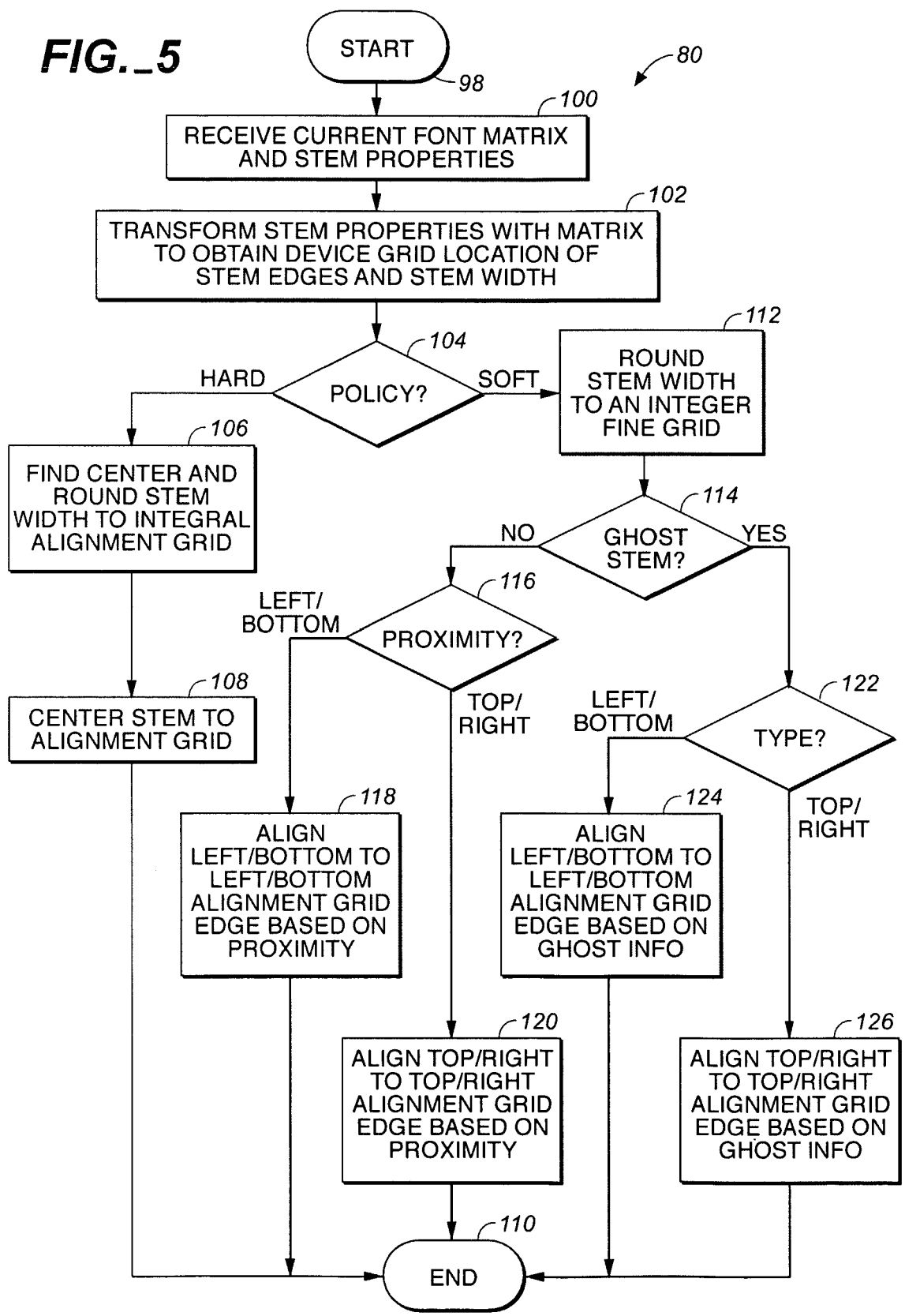
FIG._5

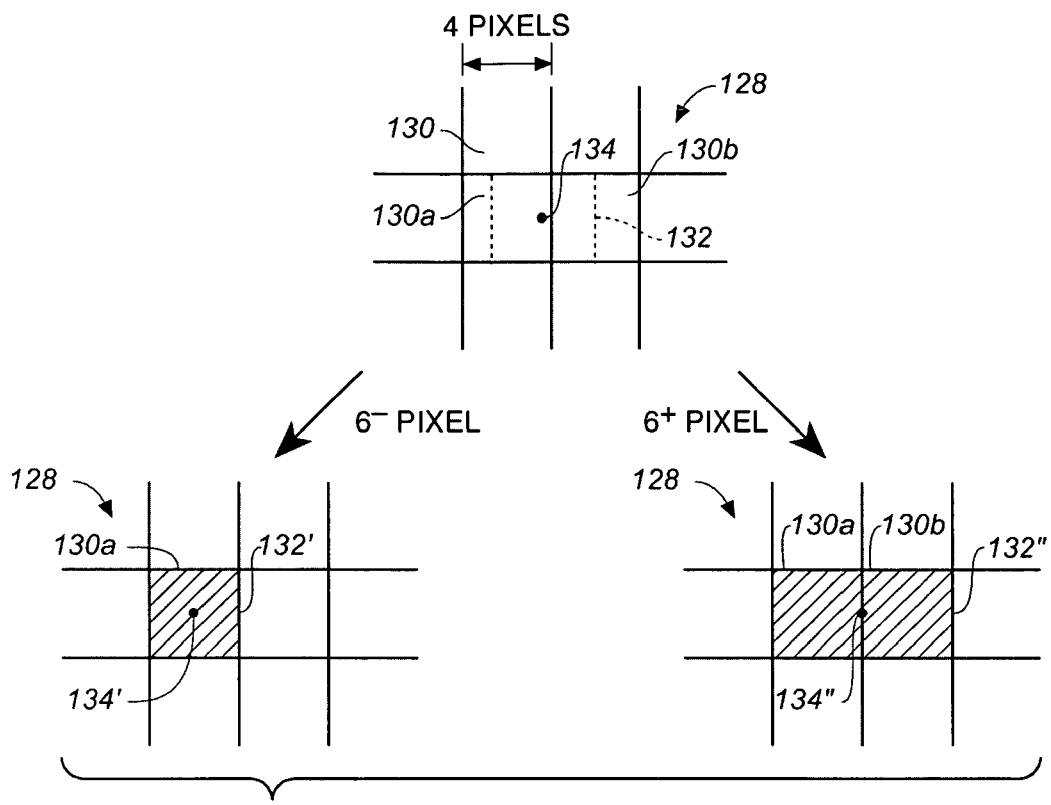
FIG._6
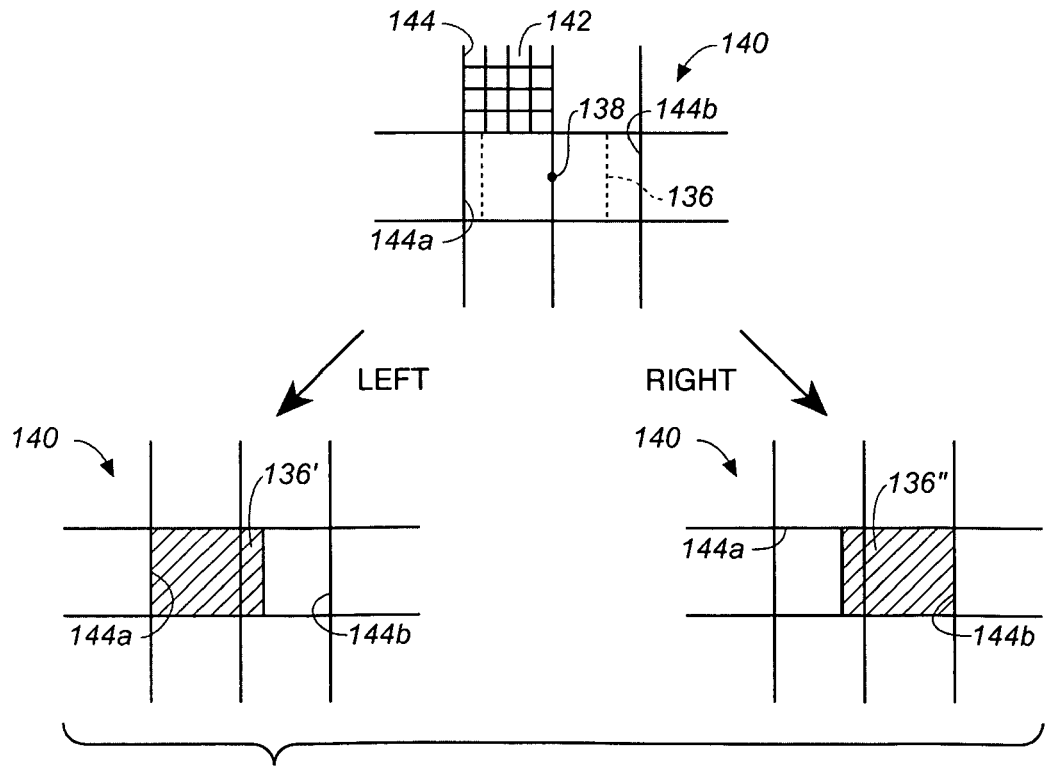
FIG._7

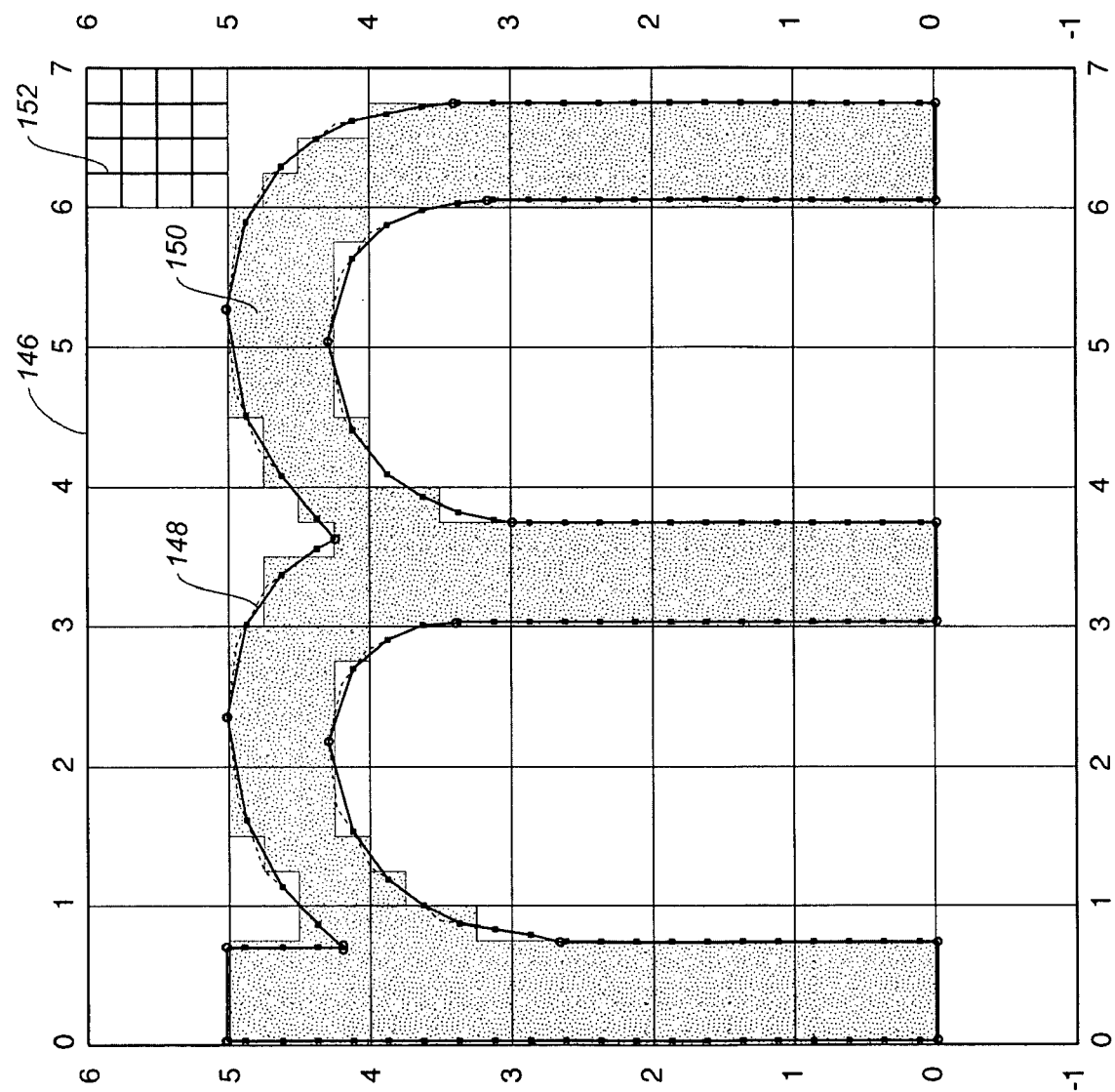
FIG._8A

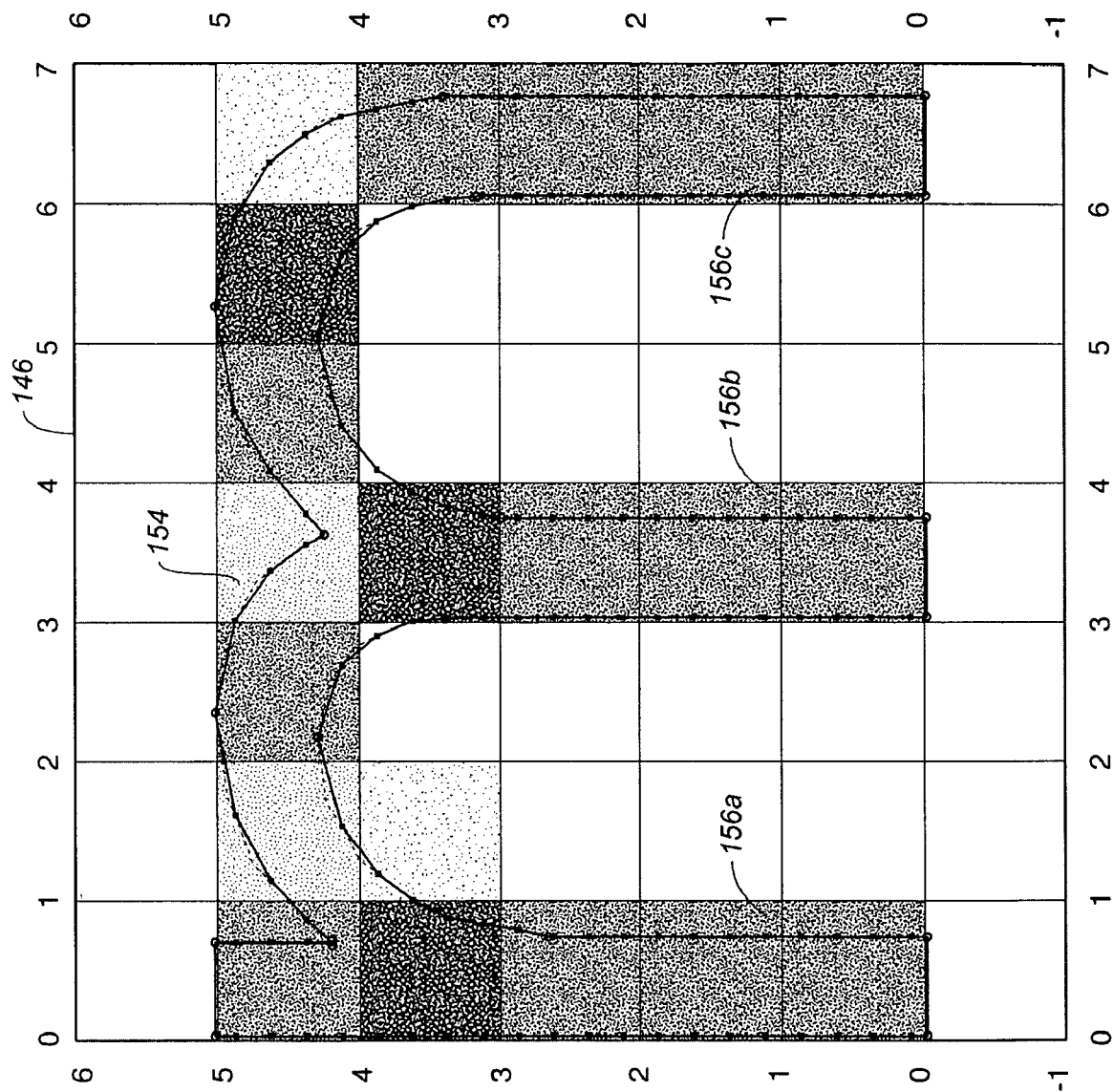
FIG._8B

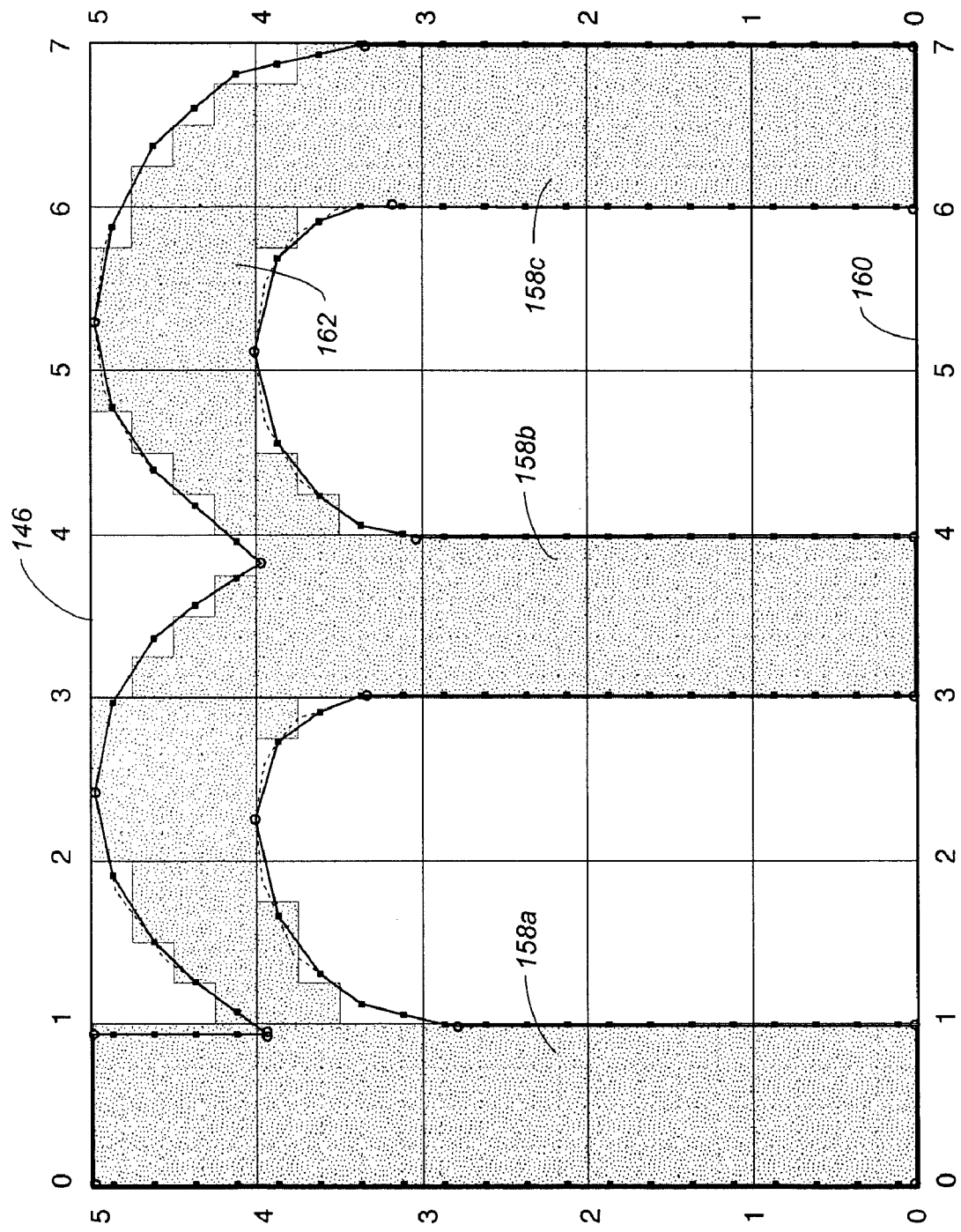
FIG._8C

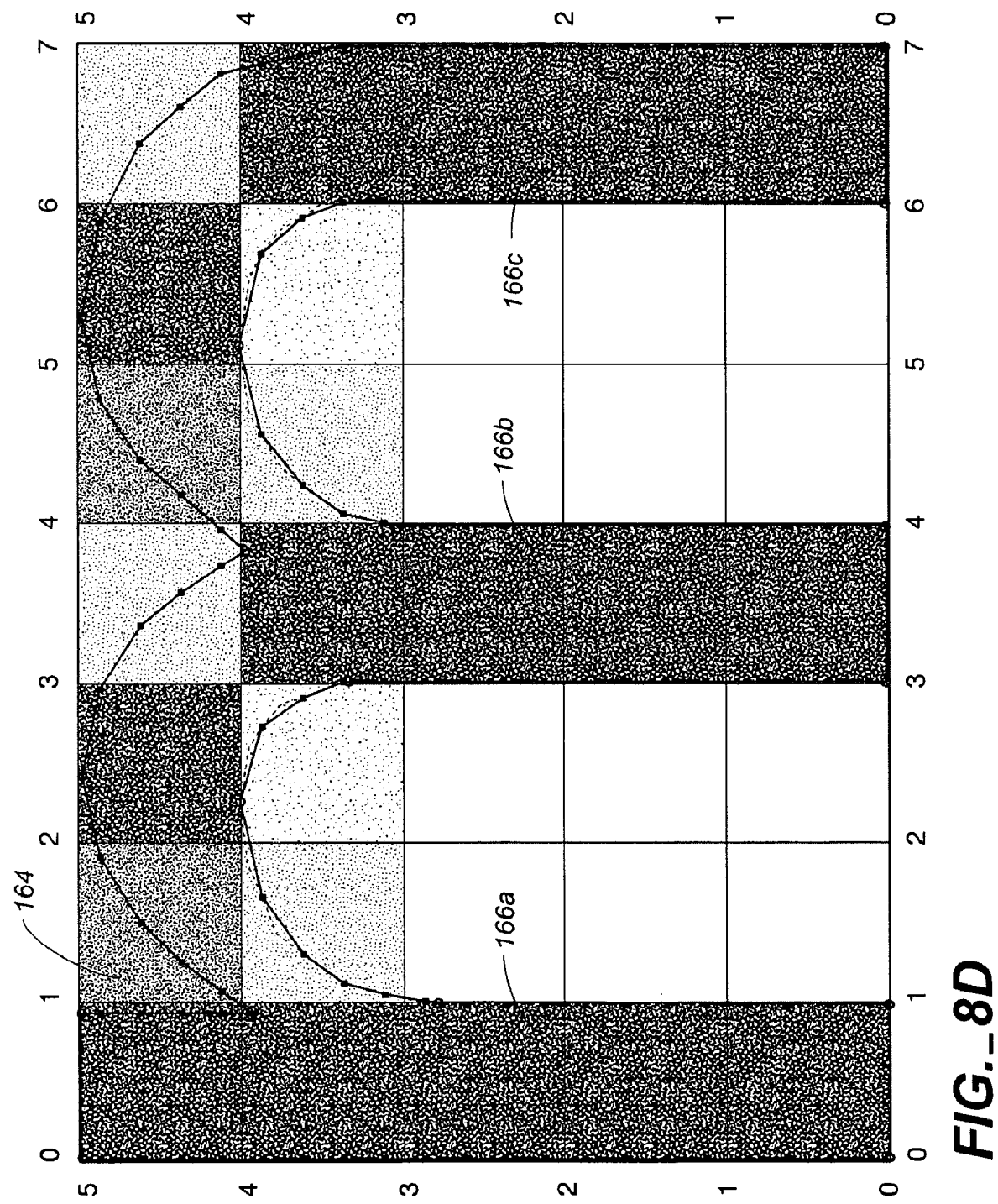
FIG._8D

DEVICE DEPENDENT RENDERING

CROSS-REFERENCE TO RELATED APPLICATIONS

This application is a continuation of, and claims priority to, U.S. patent application Ser. No. 10/388,828, entitled DEVICE DEPENDENT RENDERING, filed Mar. 14, 2003, which is a continuation of U.S. patent application Ser. No. 09/378,237, filed Aug. 19, 1999 (now U.S. Pat. No. 6,563,502, issued May 13, 2003), entitled DEVICE DEPENDENT RENDERING, to inventors Terence S. Dowling and Jeremy A. Hall. The disclosures of the above applications are incorporated herein by reference in their entirety.

BACKGROUND

This invention relates to the rendering of characters to be displayed on computer output devices. Computer systems typically include some form of visual output device. For example, in FIG. 1, a prior art computer system 10 includes a computer 12, a keyboard 14, a disk storage unit 16, a video display 18, and a printer 20.

Computer 12 includes a central processing unit (CPU) 22, read only memory (ROM) 24, random access memory (RAM) 26, and input/output (I/O) 28. The various components 22-28 of the computer 12 are coupled by a bus system 30. As will be appreciated by those skilled in the art, the representation of the computer 12 has been highly simplified for the purposes of this discussion, but includes the fundamental components of a computer and their interconnections.

Devices such as keyboard 14, disk storage 16, video display 18, and printer 20 are often referred to as "peripheral" devices. When coupled to the computer 12 they become part of computer system 10. Some peripheral devices are primarily for inputting information to the computer 12, other peripheral devices are used for outputting information from the computer 12, and some computer peripherals are used for both inputting and outputting information.

Video display 18 and printer 20 are common output devices for the computer 12. Such output devices typically form temporary or permanent images to convey information to a user of computer system 10. For example, video display 18 includes a screen that can display character, graphical, and other types of images.

A number of problems arise when displaying characters on a computer output device. The term "character", as used herein, is not limited to alphanumeric characters, but includes any form of character, number, symbol, or other coded device that can be represented or displayed on a computer output device. Some problems relate to the resolution of the output device, and other problems relate to human visual perception. "Resolution", as it is used herein, refers to the size of individual pixels of a computer output device, and the spacing between the pixels of the output device.

The problems inherent in character imaging tend to be more pronounced for small characters than for larger characters. This is because small characters are made up of fewer pixels and, therefore, even a distortion of a few pixels is readily apparent in the smaller characters. Some of the distortions that may occur, particularly in these smaller characters, are: unbalanced "stem" widths, thin feature disconnection, over/under filling, and inaccurate weighting. One of the most noticeable of these defects is unbalanced stem widths, where vertical and horizontal strokes of characters may be of varying widths due to the character rendering process. Another very noticeable defect is the inaccurate weighting effect of small characters due to a quantization effect. Adding a pixel (the "quantum") to a character stem that is only a few pixels wide can distort the "weight" given to that character, e.g. it may appear to be "bold" even when it is a normal weight character.

In FIG. 2A, the prior art problem of unbalanced stem widths is illustrated. In this instance, a lower case letter "m" is shown superimposed over a high-resolution grid 32 both in an outline form 34, and a "bitmap" form 36. "Bitmap" refers to a one-to-one mapping between data stored in the memory of the computer 12 and an image of the character to be displayed, i.e. each pixel of the output device corresponds to a bit of information stored in the computer. The outline 34 is typically provided by a parsed font program such as described in Adobe Type I format, Version 1.1, available from Adobe Systems, Inc. of San Jose, Calif., often referred to as the "Black Book" due to the color of its cover. Character outline 34 is converted or "rendered" into the bitmap 36 by a rendering program or "renderer" available from a variety of sources, including Adobe Systems, Inc.

In FIG. 2A, the letter "m" includes some distortion that is attributable to the conversion from font outline 34 to bitmap 36 form. In particular, the three vertical legs or "stems" of the letter "m" are of different widths. As noted, the left stem 38a is two pixels wide, the middle stem 38b is one pixel wide, and the right stem 38c is two pixels wide.

While characters are often rendered on a high-resolution grid as illustrated in FIG. 2A, they must be converted into a "coarse grid" representation before they can be displayed on the output device. The resolution of the coarse grid corresponds to the resolution of the output device.

In FIG. 2B, the conversion from a high-resolution grid to a coarse grid permits the renderer to re-balance the stems. More particularly, the system uses "hints" provided by the parsed font program to stretch and then align the stems of the character to the coarse grid. As noted, in FIG. 2B, the stems 40a, 40b, and 40c are all the same width and, therefore, the unbalanced stem problem can be resolved for black-and-white types of output devices.

While the prior art has solved the problem of unbalanced stem widths for black and white output devices, the problem has re-emerged for grayscale and color output devices. Some output devices use a technique known as "anti-aliasing" in order to provide the illusion of smoother curves and less jagged diagonal lines. This is accomplished by varying grayscale or color values of the coarse grid. However, this manipulation can re-introduce the problem of unbalanced stem widths to anti-aliased characters.

In FIG. 2C, the lower case letter "m" is shown against a coarse grid 42 and corresponding high-resolution grid 44. The high-resolution grid 44 is shown in only one of the cells of the coarse grid 42 so as not to confuse the drawings, although it will be appreciated that the high-resolution grid 44 is associated with all the cells of the coarse grid 42. The coarse grid and the high-resolution grid are related as follows. If the output device has $2n+1$ grayscale values, each "cell" 46 of the coarse grid 42 will have $2n$ pixels 48. To provide a more concrete example, if 17 grayscale levels are provided from pure white to pure black, then 24 or 16 pixels of the high-resolution grid are in each cell of the coarse grid 42. This means that the resolution of the high-resolution grid 44 is four times the resolution of the coarse grid 42. As before, the font outline 50 for the letter "m" is obtained, and a bitmap 52 is developed at the resolution of the high-resolution grid from the font outline 50 by the renderer.

In FIG. 2D, the bitmap 52 has been converted into a grayscale "pixel map" which can be sent to the output device. The conversion is usually accomplished in a straightforward fashion. The number of pixels for a particular cell are counted, and this number is mapped to the grayscale level for that cell. Therefore, cells having more pixels will correspond to a darker grayscale value than cells having fewer pixels. This technique, referred to as "anti-aliasing", greatly smoothes the appearance of curves and reduces the jaggedness of diagonal lines, as is well known to those skilled in the art.

As used herein, a "pixel map" is much like a "bitmap" except that multiple values are stored in the memory of the computer system 12 which correspond to each pixel of the output device. For example, for each pixel on a grayscale or color video monitor, multiple sub-pixels can be defined each including a numeric value that is stored on the computer.

However, as seen in FIG. 2D, the unbalanced stem problem has reoccurred as a result of the application of the "anti-aliasing" process. More particularly, stem 54a appears to be two pixels wide, while stems 54b and 54c appear to be about one pixel wide. Again, this stem unbalance phenomenon is quite apparent in small characters and reduces the quality of the output image.

While this discussion has centered on vertical stems, that the problem is equally apparent with horizontal stems. For example, while the example of the lower case "m" was given, this stem unbalancing problem is also apparent on letters such as an upper case "E." Furthermore, both vertical and horizontal "stems" or segments can be found in a single letter, such as the letter "o", which has two vertical side segments or stems, and two horizontal top and bottom segments or stems.

Some attempt has been made by output device manufacturers to enhance the image provided to the output device as a bitmap or a pixel map. For example, certain Hewlett-Packard Company printers provide "image enhancement" which attempts to smooth "jagged" diagonal lines and to smooth curves. While generally useful, such post-rendering image enhancement mechanisms are not completely successful because the information that was used to create the bitmap or pixel map (e.g. the font outline) is not available to the output device after the render process has been applied. Therefore, post-rendering image enhancement cannot correct problems such as unbalanced stem widths, etc.

Another technique for enhancing the image provided to the output device includes aligning stems on pixel boundaries and is described in co-pending U.S. patent application Ser. No. 08/547,562, filed Oct. 23, 1995, entitled "Method and Apparatus for Rendering Characters," to Terence Dowling, assigned to Adobe Systems, Inc of San Jose, Calif., the contents of which are expressly incorporated herein by reference. This technique does not suffer from the limitations provided by post-render solutions. However, the technique described in the Dowling application was limited in that the stem alignment was fixed to a single device grid and therefore to the device grid boundaries (pixel boundaries) defined therein.

Certain output devices, such as LCDs support sub-pixel addressing. Sub-pixel, as used herein, refers to a pixel component that is independently addressable in the output device. For example, in a conventional RGB color output LCD device, a single pixel includes three components, or sub-pixels, a red component, a green component and a blue component. Each of the three sub-pixels are independently addressable for each pixel, that is, each individual component can have a value set, the combination of which produce the color perceived by the user for a particular pixel location. In a conventional RGB LCD output device, the sub-pixels include a geometry, the sub-pixel geometry, that defines an physical arrangement of the sub-pixels on the output device. In one conventional RGB LCD output device, each sub-pixel is of the form of a color bar, and the bars are arranged as a horizontal row. Depending on the manufacturer of the output device, the ordering of the color bars may vary from device to device. For example, in a Colorbook device produced by Gateway Computers or a Inspiron 7000 device produced by Dell Computers, the sub-pixel geometry includes an arrangement of color bars in a horizontal row. Other geometries are possible including a closely packed hexagonal arrangement.

SUMMARY

The present invention provides a method for precisely placing stems of a character and increasing the effective horizontal resolution of a output device by a factor in at least one dimension. In a conventional RGB LCD device, the effective resolution can be increased by an order of magnitude of three without increasing the cost/complexity of the output device.

In one aspect, the invention provides method and apparatus, implementing and using techniques for processing a character for display on a raster output device having a resolution defined by a set of output pixel positions. A stem of the character is aligned to a best sub-pixel boundary, wherein the best sub-pixel boundary is selected from a plurality of sub-pixel boundaries based on a smallest difference between ideal locations for the stems of the character and locations of aligned stems of the character to a respective sub-pixel boundary. The character is rendered at a resolution higher than the resolution of the raster output device. The aligned character is downsampled to the raster output device resolution.

Aspects of the invention can include one or more of the following advantages. The character can be created at a type size by a font having font metrics including hinting information defining a center of a stem, and aligning the stem of the character can include laying down the character and determining an alignment grid that best aligns the center of the stem to a sub-pixel boundary. Sub-pixel geometry information for the output device defining a geometry of the addressable sub-pixels for each pixel of the output device can be received, and aligning the stem of the character can include using the sub-pixel geometry information to determine which sub-pixels of which pixels to illuminate when the stem of the character is not aligned to a pixel boundary. Down sampling can include receiving device specific data derived specifically for the output device where the device specific data includes a plurality of functions, one for each color plane used by the output device and determining an intensity for each sub-pixel of a pixel in the selected alignment grid using the device specific data to derive intensity data specifically for the output device. Aligning can include obtaining a stem width, converting the obtained stem width into an integer number of device pixels, determining an ideal alignment of a center of the stem to be a boundary between two sub-pixels if the number of device pixels is a non-zero even number, and determining an ideal alignment of a center of the stem to be a sub-pixel center if the number of device pixels is not a non-zero even number.

Aligning can include for each stem calculating a difference between an ideal stem center location and a stem center location imposed by each of the one or more sub-pixel alignment grids and selecting the sub-pixel alignment grid having the smallest difference between any ideal stem center location and a stem center location imposed by the sub-pixel alignment grid. Aligning can include for each stem calculating a difference between an ideal stem center location and a stem center location imposed by each of the one or more sub-pixel alignment grids, and selecting the sub-pixel alignment grid for which the sum of the calculated differences between the ideal stem center locations and the stem center locations imposed by the sub-pixel alignment grid is the smallest.

Rendering can include rendering the character at a resolution that is three or more times higher than the resolution of the raster output device. Rendering can include rendering the character in accordance with a hard-edged policy that does not allow anti-aliasing of horizontal and vertical stems. Rendering can include rendering the character in accordance with a soft-edged policy that allows anti-aliasing of horizontal and vertical stems. Rendering can include dynamically determining if the rendering is to be performed in accordance with a hard-edged policy or a soft-edged policy. Rendering can include determining, based on user input, if the rendering is to be performed in accordance with a hard-edged policy or a soft-edged policy.

The invention can provide one or more of the following advantages. The technique can be used to smooth curves and prevent jagged diagonal lines without introducing certain distortions into the image of the character being displayed while providing up to a threefold increase in the resolution in one dimension for an RGB output device. The invention accomplishes this task by aligning the high-resolution bitmap of the character to a sub-pixel boundary of an alignment grid and then mapping the alignment grid to the coarse grid during the rendering process. These and other advantages of the present invention will become apparent upon reading the following detailed descriptions and studying the various figures of the drawings.

BRIEF DESCRIPTION OF THE DRAWINGS

FIG. 1 is a block diagram of typical prior art computer system, which is also a suitable host for the method and apparatus of the present invention;

FIG. 2A is a view of a prior-art high-resolution bitmap for the letter "m";

FIG. 2B is a view of a prior-art bitmap of the letter "m" that has been stretched and aligned with a coarse grid such that when it is displayed on a black and white output device it will appear to have balanced stem widths;

FIG. 2C illustrates the letter "m" rendered in a high-resolution bitmap;

FIG. 2D illustrates the imbalanced stem widths that result in providing an anti-aliased version of the bitmap of FIG. 2C;

FIG. 3A is a flow-diagram of a method for creating anti-aliased characters with balanced stem widths in accordance with the present invention;

FIG. 3B shows the relationship between a device grid and alignment grids;

FIG. 4 is an illustration of the "RECEIVE CALL FROM CLIENT" step of FIG. 3A;

FIG. 5 is a flow-diagram of the "ALIGN STEMS" step of FIG. 3A;

FIG. 6 illustrates the "ROUND STEM WIDTH TO COARSE GRID" and "CENTER STEM TO COARSE GRID" steps of FIG. 5;

FIG. 7 illustrates the "ROUND STEM WIDTH TO HIGH-RESOLUTION GRID" and "ALIGN LEFT/BOTTOM AND TOP/RIGHT TO ALIGNMENT GRID" steps of FIG. 5;

FIGS. 8A, 8B, 8C, and 8D are used to illustrate a first example of the method of the present invention.

Like reference numbers and designations in the various drawings indicate like elements.

DETAILED DESCRIPTION

The present invention preferably includes processes executing ("running") on a computer system such as the computer system 10 illustrated in FIG. 1. However, as will be well appreciated by those skilled in the art, the processes and apparatuses described herein can also be implemented by hardware or firmware equivalents. For example, many font rendering and other display processes are embedded in application specific integrated circuits (ASICs), as is well known to those skilled in the art.

FIGS. 1 and 2A-2D were discussed relative to the prior art. In FIG. 3A, a process 300 in accordance with the present invention for device dependent rendering to create anti-alias characters on a computer output device begins at 302 and, in a step 304, by receiving device specific information for the computer output device. The device specific information can include geometry data and color data.

The geometry data can include sub-pixel order and physical geometry information. The physical geometry defines the arrangement of sub-pixels for the computer output device, e.g., a horizontal row of sub-pixels. The sub-pixel order defines the arrangement of the particular sub-pixels in the physical geometry, e.g., a red sub-pixel, next to a green sub-pixel, next to a blue sub-pixel for each pixel in an RGB output device. Other output configurations are possible including GBR, GRB, BRG, BGR and RBG configurations. The physical geometry for an output device can be a row of color bars in one dimension, for example a horizontal row of color bars. Other arrangements include a closely packed arrangement. Methods for determining the geometry data are described in greater detail in co-pending patent application entitled "Device Specific Color Intensity Settings and Sub-Pixel Geometry" to Terence Dowling et. al., assigned to Adobe Systems Corporation of San Jose, Calif., filed on Aug. 19, 1999, the contents of which are expressly incorporated herein by reference.

The color data can be of the form of device specific intensity data for the computer output device. The device specific intensity data can be of the form of a mathematical function that defines a mapping from idealized intensity values for a pixel to device specific intensity values. The mapping is used in the down sampling process for determining the intensity setting for a pixel in device space based on the number of pixels in the high resolution bitmap that are turned "on" when rendering the character. The rendering process is described in greater detail below. Methods for determining the color data are described in greater detail in co-pending patent application entitled "Device Specific Color Intensity Settings and Sub-Pixel Geometry"

A call is received from a client with a character pointer, size, number of grayscales, and policy (306). As used herein, a "client" is an application program, utility, or other process that is requesting a high-resolution bitmap that can be further processed and displayed on an output device. For example, a client might be a word processing program. Alternatively, the client might be part of a greater "renderer."

Hint data is evaluated for the character and a center for each stem is located (308). Hinting is used in rendering the character to avoid character distortions. Hinting is discussed in more detail below in the rendering step.

For each stem, the center of the stem is translated onto each of a series of alignment grids (310). The "device grid" as used herein, is a grid of pixel locations that maps to the output device space and is often referred to as the course grid. The "fine grid", as used herein, is a grid of samples that has a resolution that is higher than that of the device grid. Associated with each fine grid is a series of alignment grids. The alignment grids are of the same resolution as the fine grid, yet have pixel boundaries that have been shifted by one sub-pixel position. After the selection of an appropriate alignment grid, the character is initially rendered to the resolution of the fine grid as described in greater detail below.

Referring to FIG. 3B a series of alignment grids and a device grid are shown. Alignment grid 380 includes a plurality of cells 382 that include a plurality of pixels 384. Each cell 382 maps directly to a single pixel in device grid 392. Each device pixel 393 in device grid 392, is defined by a series of sub-pixels 394, arranged in a geometry. Alignment grid 386 includes a plurality of cells 387 that include a plurality of pixels 388. Each cell in alignment grid 386 maps to a single "composite pixel" located in device grid 392. A "composite pixel", as used herein, refers to a series of adjacent sub-pixels, that in aggregate form a pixel, yet are not grouped together to form a device pixel in device grid 392. For example, sub-pixels 394-2, 394-3 and 394-4, that belong to device pixels 393-1, 393-1 and 393-2 respectively, form composite pixel 395.

The mapping of alignment grid 386 to device grid 392 is similar to the mapping of alignment grid 380 to device grid 392, but shifted by one sub-pixel. Similarly, alignment grid 389 includes cells 390 that include a plurality of pixels 391. Each cell in alignment grid 389 maps to a single "composite pixel" 395 located in device grid 392.

Referring again to FIG. 3A, an ideal location for the center of each stem is computed for each alignment grid (312). The ideal location data is compared and a best alignment grid is selected (314). More specifically, an alignment grid is selected from the set of alignment grids based on the location of the center of the stem to a sub-pixel boundary of the device grid (which corresponds to a pixel boundary of one of the alignment grids). The alignment grid selected is the grid having a pixel boundary that is closest to the ideal location of the center of the stem.

In one implementation, the best alignment grid is selected as follows. Every normal stem hint defines two edges in the character space coordinate system. The center of the hint (a value half way between the two edges) is used to determine position for alignment. The stem width (distance between edges) is compared with one or more standard widths (specified by the font program as StdVW, StdHW, StemSnapH, StemSnapV). If the value is close enough to the standard the standard width is used, otherwise the stem width is used. The width obtained is converted to device pixels using the provided coordinate transformation and the result is rounded to the nearest whole number representing the device grid size. This will yield a result of 0, 1, 2, 3, . . . device pixels. If the number is zero or odd then the preferred alignment is a pixel (or sub-pixel) center. If the result is even, the preferred alignment is on the boundary between pixels (or sub-pixels). With the center position and alignment rule (the pixel center or pixel edge), the device distance to the nearest alignment grid of each phase can be computed. This process is repeated for every stem. When all of these distances for each stem and alignment grid phase are available, the alignment grid phase with the smallest "error" (that is, difference between the "ideal" stem center locations and those imposed by grid alignment with the selected alignment grid phase) can be determined. "Small," as used herein, may be defined as either the smallest sum of errors (in absolute value) or the smallest maximum error.

Referring again to FIG. 3A, the character is rendered to produce a high resolution bit map of the character including aligning the character to the selected alignment grid (316). Typically, the character is rendered at three or more times the output resolution. Hinting is used in rendering the character to avoid character distortions. More specifically, hint data is evaluated for each character to locate the horizontal and vertical stems for the character and the position and width of each. For each stem, the stem width is determined. The stem width is compared to a standard stem width. If the stem width is close to the standard width, then width of the stem is set to be the standard stem width. The standard width is a multiple of the pixel width (in device space). If the width determined is not a multiple of a pixel width, the stem is stretched or contracted to be a multiple of a pixel width.

Each stem is aligned to the selected alignment grid based on the policy information. As will be discussed in greater detail later, this policy includes whether the character should be "hard-edged" or "soft-edged", which may sometimes be referred to as "hard" or "soft" policies, respectively. This policy can be selected dynamically by the renderer, the client, or can be predetermined by the creator of the render. Alignment is discussed in greater detail below in association with FIG. 6.

A mapping is determined from each ideal pixel in the selected alignment grid to a respective device pixel in the device grid (320). The geometry data is retrieved and used in the mapping. More specifically, a cell of pixels in the alignment grid is mapped to either a device pixel or a composite pixel in the device grid (depending on the alignment grid selected). In one implementation, the mapping from the alignment grid to device grid is defined mathematically, where $P = ideal \times hint \times font\ point\ size \times device\ resolution;$
where P=the device pixel location in the device grid,
ideal=to the ideal pixel location in the alignment grid,
hint=hint stretching or shrinking factor, and
device resolution is the resolution of the output device in device space.

Once mapped, a device specific intensity value is calculated for each pixel location in the device grid (322). The device specific intensity values is calculated from the ideal intensity value for a given cell of the alignment grid. The ideal intensity setting for a device pixel is calculated by in a straightforward fashion. In one implementation, the ideal intensity value is calculated as described in the co-pending application entitled "Method and Apparatus for Rendering Characters". Alternatively, the ideal intensity value can be calculated (and scaled) as is described in U.S. Pat. No. 5,929,866 entitled "Anti-aliasing Small Characters" to David Arnold, assigned to Adobe Systems, Inc. of San Jose, Calif., the contents of which are expressly incorporated herein by reference. After an ideal intensity value is determined, the color data is retrieved. The color data defines a mapping from idealized intensity values to device specific intensity values. The mapping is used to determine the intensity setting for a pixel (or composite pixel) in device space. Thereafter the process ends.

FIG. 4 is used to illustrate step 306 of FIG. 3 in greater detail. More particularly, an enhanced font renderer 88 of the present invention receives a call 89 from a client 90 which includes a character pointer, a character size, the number of grayscales, and the policy. The renderer 88 creates a call 91 to a parsed font program 92 which returns a character program (to create the font outline of the character), font values, and font family values as illustrated at 93. The enhanced font renderer 88 then passes a high-resolution bitmap as illustrated at 95 to the client 90, which does the grayscale rendering and which sends a low resolution pixel map 96 to an output image device 94.

As explained above, the client 90 can be any application program, utility, or other computer-implemented process capable of requesting that a character be displayed on the output device 94. The parsed font program is preferably a font program such as Adobe-type I format available from Adobe Systems, Inc. of San Jose, Calif. A complete description of the use and operation of a parsed font program 92 can be found in the "Black Book", supra.

It is readily apparent to those skilled in the art and with knowledge of the contents of the "Black Book" how clients such as client 90 make calls to renderers, and receive high-resolution bitmaps back from the renderers, and further, how client 90 can produce a pixel map from the high-resolution bitmap for the output device 94. The use of a parsed font program 92 is also well known to those skilled in the art, along with the receipt of calls from a renderer, and the providing of the character program, font values, and font family values.

In FIG. 5, step 318 of FIG. 3A is illustrated in greater detail. More particularly, process step 318 begins at 98 and, in a step 100, the current font matrix and stem properties are received from the parsed font program 92. Details of the operation are again explained in the "Black Book." Next, the stem properties are transformed with the matrix to obtain alignment grid locations of the stem edges and stem widths in a step 102.

In a step 104, it is determined whether the policy is a "hard-edge" or a "soft-edge" policy. A hard-edge or "hard" policy is one wherein vertical and horizontal stems are made perfectly black, i.e., grayscale is not used. In a hard-edge policy, only curves and diagonals are subject to grayscale-type anti-aliasing techniques. In contrast, soft-edge or "soft" policies permit anti-aliasing of the horizontal and vertical stems.

Whether hard-edge or soft-edge policies are adopted may be chosen by the client or left to the discretion of the renderer. Hard-edge policies tend to make sharper, darker stems, but may suffer from some of the quantization effects noted earlier. Soft-edge policies appear to be smoother, but may seem "fuzzy" to some viewers.

If a hard-edge policy is chosen, step 106 rounds the stem width to an integral coarse grid. By "integral" it is meant an integral multiple of a cell width is chosen, i.e. 1, 2, 3, etc. multiples of the cell width. Next, in a step 108, the stem is centered to the alignment grid and the process is completed at 110.

If a soft policy is selected as detected by step 104, a step 112 rounds the stem width to an integral high-resolution grid, and then a decision step 114 determines whether the stem is a "ghost" stem. The term "integral" is used in a similar fashion here to mean integer multiples of the high-resolution grid pixels, i.e. 1, 2, 3, etc. multiples of the high-resolution grid pixels. "Ghost" stems are discussed in the aforementioned "Black Book" and, briefly, are stems that have only one edge to control.

If the stems are not ghost stems, a step 116 determines the proximity of the stem to a pixel boundary of the grid and aligns the stem to a pixel boundary of the alignment grid based on this proximity.

If step 114 determines that the stem is a ghost stem, a decision step 122 determines the type of ghost stem. If it is a left/bottom ghost stem, it is aligned with a left/bottom of the alignment grid cell based on this ghost information. If it is a top/right ghost stem, it aligns to the top/right of the coarse grid cell based on this ghost information in the step 126. Note that this adjustment is not proximity determined as in step 116, but rather directed by the "ghost" hint itself. After the completion of any of steps 118, 120, 124, and 126, the process is completed as illustrated at 110.

In FIG. 6, an illustration is made to help explain the hard policy steps 106 and 108 of FIG. 6. In FIG. 6, a coarse grid 128 will be assumed for the purposes of example to have cells 130 that are square and which are four pixels on each side. An "ideal" spot 132 is shown to be partially within cell 130a, and also partially within an adjacent cell 130b. The center of this ideal spot 132 is shown at 134.

At this point it should be noted that there are some device-dependent and some designer-dependent decisions that can be made. For example, the decision as to how to align the ideal spot 132 with the coarse grid 128 very much depends upon the type of output device used and upon designer decisions. For example, most first generation personal computer printers use the "Canon" print engines manufactured by Canon, Inc. of Japan. With these first generation printers, a round pixel is printed that completely covers the cell of the coarse grid, i.e. the round pixel has a diameter that is about equal to a diagonal of the cell of the grid.

In recent years, a number of new types of print engines have been developed. For example, a "Xerox" engine manufactured by Xerox, Inc. of the U.S. produces a pixel having four concave sides such that the pixel fits entirely within the cell of the coarse grid. As a result, three pixels produced by a Canon engine can cover 3.8 cells of the coarse grid, while four pixels produced by a Xerox engine can cover 3.7 cells of the coarse grid.

With the foregoing explanation in mind, a step 108 of FIG. 5 will be discussed as if an output device can produce a perfectly square pixel corresponding to the square cell 30 of the coarse grid 128, it being understood that this is only an approximation of the reality. As seen in FIG. 6, if the ideal spot 132 is less than 6 pixels ("6−" pixels), it will be shrunk to four pixels in width and aligned with the cell 130a. However, if the spot 132 is greater than 6 pixels ("6+" pixels), it will be increased to 8 pixels in width and will be caused to fill both cells 130a and 130b. In the first instance, the center of the spot 132' is at 134' (i.e. the center of cell 138), and in the other instance the spot 132" has a center 134" which is at the interface between cells 130a and 130b. In this way, the spot 132 is aligned to the coarse grid 128 such that the balance of stem weights is preserved.

In FIG. 7, the soft-edge policy is illustrated. More particularly, FIG. 7 illustrates the steps 112, 118, 120, 124, and 126 of FIG. 5. As seen in FIG. 7, an ideal spot 136 has a center 138 and is associated with a coarse grid 140 and a high-resolution grid 142. As before, the high-resolution grid is shown in only one of the cells 144 of the coarse grid 140 so as not to confuse the drawings, although it will be appreciated that the high-resolution grid 142 is associated with all the cells of the coarse grid 140.

In accordance with the "soft-edge" policy, step 112 first rounds the stem width to an integral high-resolution grid 142. In this instance, a side of a high-resolution grid pixel is ¼ of a side of a cell 144. Therefore, the width of the stem 134 is rounded to the nearest ¼ of an alignment grid cell in a step 112. Next, it is determined which cells of the alignment grid 140 the rounded stem width is to be aligned with. This is the purpose of steps 114, 116, and 122. When the proper alignment grid cell is found, the rounded stem is aligned accordingly.

In this example, the spot 136 is somewhat centered within a cell 144a and 144b. If it is determined that the rounded stem is to be aligned to the left cell, it is moved as indicated to the position 136" such that it completely fills the cell 144a and overlaps partially the cell 144b. If, on the other hand, it is to be aligned with the right cell, it is moved so that it completely fills the cell 144b and partially overlaps with the cell 144a.

By analogy, if the stem 136 is only partially overlapping the cell in the vertical direction, it can be aligned to the top or bottom of the cell of the coarse grid in a similar fashion. Furthermore, if it only partially overlaps a cell both in the vertical and horizontal direction, it can be caused to move to align with the cell of the alignment grid both in the left/bottom and top/right directions. Therefore, both horizontal and vertical stems can be handled by the process and apparatus of the present invention.

The foregoing descriptions and illustrations describe the basic process and apparatus of the present invention. As mentioned previously, the process of the present invention is preferably practiced on a general-purpose computer system to provide images on an output device such as a video monitor, a video projection system, or a continuous-tone printer. The process and apparatus of the present invention will be further discussed in terms of an illustrative example.

Example 1

The Lower Case Letter "m"

In FIG. 8A, the font outline 148 of the letter "m" is shown superimposed over a coarse grid 146. A high-resolution bitmap 150 is created from this font outline 148. It will be noted that the high-resolution bitmap 150 is aligned with a high-resolution grid 152.

FIG. 8B illustrates the pixel map as created in accordance with the "soft-edge" policy of the present invention. The high-resolution bitmap 150 is first rounded with respect to high-resolution grid 152, and is then aligned with the coarse grid 146 as described above. Then the pixel map 154 is created by this rounded and aligned bitmap to provide the appropriate grayscale data for the output device. As can be seen, the stems 156a, 156b, and 156c are all of the same width and have about the same pixel density. This will provide an anti-aliased output, while still preserving stem width balance.

The "hard-edge" policy will be described with reference to FIG. 8C. In this instance, the data as illustrated in FIG. 8A is "stretched" such that each of the stems 158a, 158b, and 158c have the width of a cell 160 of the coarse grid 148. This is in accordance with steps 106 and 108 of FIG. 5. Next, the "stretched" bitmap 160 of FIG. 8C is converted to the grayscale pixel map 164 of FIG. 8D. Note, once again, that the stems 166a, 166b, and 166c of the pixel map 164 are of the same width and, substantially of the same density. This allows the letter "m" to be anti-aliased while preserving its stem weight balance.

While this invention has been described in terms of several preferred embodiments, there are alterations, permutations, and equivalents which fall within the scope of this invention. It should also be noted that there are may alternative ways of implementing both the process and apparatus of the present invention, and that certain concepts were introduced for the purpose of instruction and clarity.

For example, as described previously, coarse, alignment and high-resolution grids are preferably not actually "constructed" within the process but, rather, are used herein to explain the concepts of the present invention. Also, as will be appreciated by those skilled in the art, the order of steps can often be changed, and certain steps have been simplified for the purpose of clarity. For example, the step of "rendering a high-resolution bitmap" is preferably implemented by first developing a high-resolution "hintmap", providing adjustments to the hintmap, and then rendering the actual pixels of the high-resolution bitmap. The "hintmap" is simply a high-resolution representation of the grid-fit alignment zones of the character, as will be appreciated by those skilled in the art. Alternatively, the high-resolution bitmap rendering step can be the single step described above. The geometry can be two dimensional, and as such, the increase in resolution can be realized in more than one dimension.

It is therefore intended that the following appended claims be interpreted as including all such alterations, permutations, and equivalents as fall within the true spirit and scope of the present invention.

What is claimed is:

1. A computer-implemented method for processing a character for display on a raster output device where the output device has a resolution and a set of pixels defining a device grid, the method comprising:
   receiving a character having a plurality of stems, each stem having a center, the center of each stem having an ideal location for display;
   determining, in a computer system, a plurality of alignment grids for the character on the device grid where each alignment grid is offset from another alignment grid by at least one sub pixel on the device grid and where each alignment grid determines a grid-imposed location for each stem;
   computing, in the computer system, an error for each alignment grid where the error is computed based on differences between the ideal locations for the stem centers and the grid-imposed locations of the stem centers;
   selecting a best alignment grid from the plurality of alignment grids, the best alignment grid having a smallest error; and
   rendering the character on the output device based on the best alignment grid.

2. The method of claim 1 where the character is created at a type size by a font having font metrics including hinting information defining the center of each respective stem.

3. The method of claim 1, further comprising:
   receiving sub-pixel geometry information for the raster output device defining a geometry of addressable sub-pixels, the raster output device having a plurality of pixels, each pixel including multiple sub-pixels, where rendering the character includes using the sub-pixel geometry information to determine which sub-pixels to illuminate when a stem in the plurality of stems is not aligned to a pixel boundary.

4. The method of claim 1, the method further comprising:
   receiving device specific data derived specifically for the raster output device; and
   determining an intensity for sub-pixels of the raster output device using the device specific data to derive intensity data specifically for the raster output device.

5. The method of claim 1, where computing the error includes:
   obtaining a width of a stem in the plurality of stems;
   converting the obtained stem width into an integer number of device pixels belonging to the raster output device, each device pixel including a plurality of sub-pixels;
   if the number of device pixels is a non-zero even number, the grid-imposed location for the center of the stem is a boundary between two sub-pixels; and
   if the number of device pixels is not a non-zero even number, the grid-imposed location for the center of the stem is a sub-pixel center.

6. The method of claim 1, where:
   computing the error includes determining a smallest difference between any of the ideal locations for the centers of the plurality of stems and the respective grid-imposed locations for the centers of the plurality of stems.

7. The method of claim 1, where:
   computing the error includes determining a smallest sum of the differences between the ideal locations for the centers of the plurality of stems and the respective grid-imposed locations for the centers of the plurality of stems.

8. The method of claim 1, where rendering includes:
rendering the character at a resolution that is three or more times higher than a resolution of the raster output device.

9. The method of claim 1, where rendering includes:
rendering the character in accordance with a hard-edged policy that does not allow anti-aliasing of horizontal and vertical stems.

10. The method of claim 1, where rendering includes:
rendering the character in accordance with a soft-edged policy that allows anti-aliasing of horizontal and vertical stems.

11. The method of claim 1, where rendering includes:
dynamically determining if the rendering is to be performed in accordance with a hard-edged policy or a soft-edged policy.

12. The method of claim 1, where rendering includes:
determining, based on user input, if the rendering is to be performed in accordance with a hard-edged policy or a soft-edged policy.

13. The method of claim 1, wherein a sub-pixel is an independently addressable pixel component of the device grid.

14. The method of claim 1, wherein a sub-pixel is a red, green, or blue component of device pixel.

15. The method of claim 1, where an alignment grid comprises composite pixels, a composite pixel being formed by a series of adjacent sub-pixels, that in aggregate form a pixel, yet are not grouped together to form a device pixel in a device grid.

16. A system comprising:
a display device; and
one or more processors to perform operations comprising:
receiving a character having a plurality of stems, each stem having a center, the center of each stem having an ideal location for display;
determining a plurality of alignment grids for the character on the device grid where each alignment grid is offset from another alignment grid by at least one sub pixel on the device grid and where each alignment grid determines a grid-imposed location for each stem;
computing an error for each alignment grid where the error is computed based on differences between the ideal locations for the stem centers and the grid-imposed locations of the stem centers;
selecting a best alignment grid from the plurality of alignment grids, the best alignment grid having a smallest error; and
rendering the character based on the best alignment grid.

17. The system of claim 16, where the character is created at a type size by a font having font metrics including hinting information defining the center of each respective stem.

18. The system of claim 16, further comprising:
receiving sub-pixel geometry information for the raster output device defining a geometry of addressable sub-pixels, the raster output device having a plurality of pixels, each pixel including multiple sub-pixels, where rendering the character includes using the sub-pixel geometry information to determine which sub-pixels to illuminate when a stem in the plurality of stems is not aligned to a pixel boundary.

19. The system of claim 16, further comprising:
receiving device specific data derived specifically for the raster output device; and
determining an intensity for sub-pixels of the raster output device using the device specific data to derive intensity data specifically for the raster output device.

20. The system of claim 16, where computing the error includes:
obtaining a width of a stem in the plurality of stems;
converting the obtained stem width into an integer number of device pixels belonging to the raster output device, each device pixel including a plurality of sub-pixels;
if the number of device pixels is a non-zero even number, the grid-imposed location for the center of the stem is a boundary between two sub-pixels; and
if the number of device pixels is not a non-zero even number, the grid-imposed location for the center of the stem is a sub-pixel center.

21. The system of claim 16, where:
computing the error includes determining a smallest difference between any of the ideal locations for the centers of the plurality of stems and the respective grid-imposed locations for the centers of the plurality of stems.

22. The system of claim 16, where:
computing the error includes determining a smallest sum of the differences between the ideal locations for the centers of the plurality of stems and the respective grid-imposed locations for the centers of the plurality of stems.

23. The system of claim 16, where rendering includes:
rendering the character at a resolution that is three or more times higher than a resolution of the raster output device.

24. The system of claim 16, where rendering includes:
rendering the character in accordance with a hard-edged policy that does not allow anti-aliasing of horizontal and vertical stems.

25. The system of claim 16, where rendering includes:
rendering the character in accordance with a soft-edged policy that allows anti-aliasing of horizontal and vertical stems.

26. The system of claim 16, where rendering includes:
dynamically determining if the rendering is to be performed in accordance with a hard-edged policy or a soft-edged policy.

27. The system of claim 16, where rendering includes:
determining, based on user input, if the rendering is to be performed in accordance with a hard-edged policy or a soft-edged policy.

28. The system of claim 16, wherein a sub-pixel is an independently addressable pixel component of the device grid.

29. The system of claim 16, wherein a sub-pixel is a red, green, or blue component of device pixel.

30. The system of claim 16, where an alignment grid comprises composite pixels, a composite pixel being formed by a series of adjacent sub-pixels, that in aggregate form a pixel, yet are not grouped together to form a device pixel in a device grid.

31. A computer program product, tangibly stored on a computer-readable medium, the computer program product comprising instructions operable to cause a programmable processor to perform operations comprising:
receiving a character having a plurality of stems, each stem having a center, the center of each stem having an ideal location for display;
determining a plurality of alignment grids for the character on the device grid where each alignment grid is offset from another alignment grid by at least one sub pixel on the device grid and where each alignment grid determines a grid-imposed location for each stem;

computing an error for each alignment grid where the error is computed based on differences between the ideal locations for the stem centers and the grid-imposed locations of the stem centers;

selecting a best alignment grid from the plurality of alignment grids, the best alignment grid having a smallest error; and rendering the character based on the best alignment grid.

32. The computer program product of claim 31, where the character is created at a type size by a font having font metrics including hinting information defining the center of each respective stem.

33. The computer program product of claim 31, the operations further comprising:

receiving sub-pixel geometry information for the raster output device defining a geometry of addressable sub-pixels, the raster output device having a plurality of pixels, each pixel including multiple sub-pixels, where rendering the character includes using the sub-pixel geometry information to determine which sub-pixels to illuminate when a stem in the plurality of stems is not aligned to a pixel boundary.

34. The computer program product of claim 31, the operations further comprising:

receiving device specific data derived specifically for the raster output device; and determining an intensity for sub-pixels of the raster output device using the device specific data to derive intensity data specifically for the raster output device.

35. The computer program product of claim 31, where computing the error includes:

obtaining a width of a stem in the plurality of stems;

converting the obtained stem width into an integer number of device pixels belonging to the raster output device, each device pixel including a plurality of sub-pixels;

if the number of device pixels is a non-zero even number, the grid-imposed location for the center of the stem is a boundary between two sub-pixels; and if the number of device pixels is not a non-zero even number, the grid-imposed location for the center of the stem is a sub-pixel center.

36. The computer program product of claim 31, where:

computing the error includes determining a smallest difference between any of the ideal locations for the centers of the plurality of stems and the respective grid-imposed locations for the centers of the plurality of stems.

37. The computer program product of claim 31, where:

computing the error includes determining a smallest sum of the differences between the ideal locations for the centers of the plurality of stems and the respective grid-imposed locations for the centers of the plurality of stems.

38. The computer program product of claim 31, where rendering includes:

rendering the character at a resolution that is three or more times higher than a resolution of the raster output device.

39. The computer program product of claim 31, where rendering includes:

rendering the character in accordance with a hard-edged policy that does not allow anti-aliasing of horizontal and vertical stems.

40. The computer program product of claim 31, where rendering includes:

rendering the character in accordance with a soft-edged policy that allows anti-aliasing of horizontal and vertical stems.

41. The computer program product of claim 31, where rendering includes:

dynamically determining if the rendering is to be performed in accordance with a hard-edged policy or a soft-edged policy.

42. The computer program product of claim 31, where rendering includes:

determining, based on user input, if the rendering is to be performed in accordance with a hard-edged policy or a soft-edged policy.

43. The computer program product of claim 31, wherein a sub-pixel is an independently addressable pixel component of the device grid.

44. The computer program product of claim 31, wherein a sub-pixel is a red, green, or blue component of device pixel.

45. The computer program product of claim 31, where an alignment grid comprises composite pixels, a composite pixel being formed by a series of adjacent sub-pixels, that in aggregate form a pixel, yet are not grouped together to form a device pixel in a device grid.

* * * * *